US012756851B2

(12) United States Patent
Kim

(10) Patent No.: US 12,756,851 B2
(45) Date of Patent: *Oct. 6, 2026

(54) IMAGE ENCODING/DECODING METHOD AND APPARATUS USING INTER PREDICTION

(71) Applicant: B1 INSTITUTE OF IMAGE TECHNOLOGY, INC., Seoul (KR)

(72) Inventor: Ki Baek Kim, Daejeon (KR)

(73) Assignee: B1 INSTITUTE OF IMAGE TECHNOLOGY, INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/029,633

(22) Filed: Jan. 17, 2025

(65) Prior Publication Data

US 2025/0168379 A1 May 22, 2025

Related U.S. Application Data

(63) Continuation of application No. 18/499,829, filed on Nov. 1, 2023, now Pat. No. 12,244,842, which is a (Continued)

(30) Foreign Application Priority Data

Sep. 11, 2018 (KR) ........................ 10-2018-0108607
Sep. 14, 2018 (KR) ........................ 10-2018-0110173
Sep. 24, 2018 (KR) ........................ 10-2018-0114538

(51) Int. Cl.
*H04N 19/44* (2014.01)
*H04N 19/105* (2014.01)
(Continued)

(52) U.S. Cl.
CPC ........... *H04N 19/44* (2014.11); *H04N 19/105* (2014.11); *H04N 19/117* (2014.11); (Continued)

(58) Field of Classification Search
CPC .... H04N 19/44; H04N 19/105; H04N 19/117; H04N 19/137; H04N 19/159; H04N 19/176; H04N 19/513; H04N 19/82
See application file for complete search history.

(56) References Cited

U.S. PATENT DOCUMENTS

2004/0252759 A1 12/2004 John Winder et al.
2009/0034619 A1 2/2009 Mukherjee et al.
(Continued)

FOREIGN PATENT DOCUMENTS

CN 103299642 A 9/2013
CN 104012096 A 8/2014
(Continued)

OTHER PUBLICATIONS

Machine Translation of counterpart Korean Application No. 10-678968 (Year: 2016).
(Continued)

*Primary Examiner* — Dave Czekaj
*Assistant Examiner* — Shanika M Brumfield
(74) *Attorney, Agent, or Firm* — NSIP Law

(57) ABSTRACT

An image encoding/decoding method and apparatus of the present invention may derive motion information of a current block, and perform motion compensation for the current block on the basis of the motion information. The motion information of the current block is derived on the basis of an inter-mode predefined in an encoding/decoding apparatus, and the predefined inter-mode may include at least one of a merge mode, an AMVP mode, an affine mode, or an intra block copy (IBC) mode.

7 Claims, 10 Drawing Sheets

Related U.S. Application Data continuation of application No. 17/273,867, filed as application No. PCT/KR2019/011837 on Sep. 11, 2019, now Pat. No. 11,849,132.

(51) Int. Cl.

| | |
|---|---|
| ***H04N 19/117*** | (2014.01) |
| ***H04N 19/137*** | (2014.01) |
| ***H04N 19/159*** | (2014.01) |
| ***H04N 19/176*** | (2014.01) |
| ***H04N 19/513*** | (2014.01) |
| ***H04N 19/82*** | (2014.01) |

(52) U.S. Cl.

CPC ......... *H04N 19/137* (2014.11); *H04N 19/159* (2014.11); *H04N 19/176* (2014.11); *H04N 19/513* (2014.11); *H04N 19/82* (2014.11)

(56) References Cited

U.S. PATENT DOCUMENTS

| | | | | |
|---|---|---|---|---|
| 2012/0093226 | A1* | 4/2012 | Chien .................. | H04N 19/139 375/E7.123 |
| 2012/0195368 | A1 | 8/2012 | Chien et al. | |
| 2012/0314771 | A1 | 12/2012 | Lim et al. | |
| 2013/0156335 | A1 | 6/2013 | Lim et al. | |
| 2013/0163668 | A1 | 6/2013 | Chen et al. | |
| 2013/0272410 | A1 | 10/2013 | Seregin et al. | |
| 2015/0071356 | A1 | 3/2015 | Kim et al. | |
| 2016/0323600 | A1* | 11/2016 | Ma ......................... | H04N 19/11 |
| 2016/0337649 | A1 | 11/2016 | Chuang et al. | |
| 2017/0180738 | A1 | 6/2017 | Park | |
| 2017/0310961 | A1* | 10/2017 | Liu ...................... | H04N 19/107 |
| 2018/0262760 | A1* | 9/2018 | Zhang .................. | H04N 19/176 |
| 2020/0021839 | A1 | 1/2020 | Pham Van et al. | |
| 2020/0045322 | A1 | 2/2020 | Ye et al. | |
| 2020/0236395 | A1* | 7/2020 | Lee ........................ | H04N 19/53 |

FOREIGN PATENT DOCUMENTS

| | | | | |
|---|---|---|---|---|
| KR | 10-2014-0136428 A | | 11/2014 | |
| KR | 10-1678968 B1 | | 11/2016 | |
| KR | 10-2018-0058233 A | | 5/2018 | |
| WO | WO 2011/021915 A2 | | 2/2011 | |
| WO | WO-2012042893 A1 | * | 4/2012 | ........... H04N 19/523 |

OTHER PUBLICATIONS

International Search Report issued on Dec. 24, 2019 in counterpart International Patent Application No. PCT/KR2019/011837 (2 pages in English and 2 pages in Korean).

* cited by examiner

FIG. 3
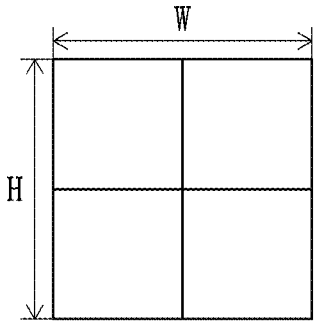
FIG.3A
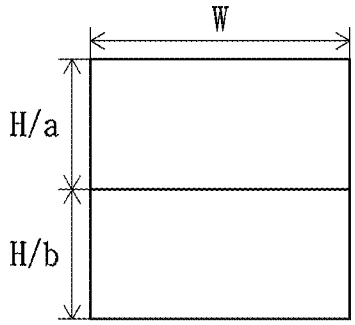
FIG.3B
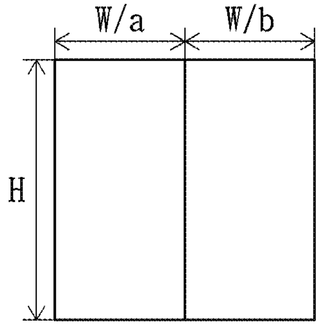
FIG.3C
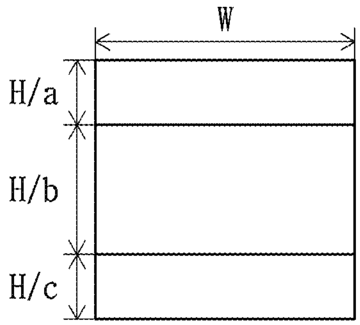
FIG.3D
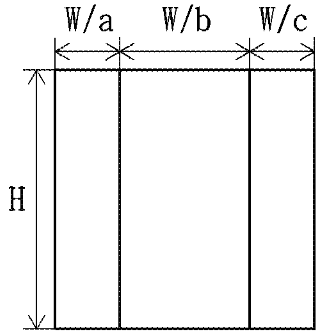
FIG.3E

IMAGE ENCODING/DECODING METHOD AND APPARATUS USING INTER PREDICTION

CROSS REFERENCE TO RELATED APPLICATIONS

This application is a continuation of application Ser. No. 18/499,829 filed on Nov. 1, 2023, which is a continuation of application Ser. No. 17/273,867 filed on Mar. 5, 2021, now U.S. Pat. No. 11,849,132, which is a U.S. National Stage Application of International Application No. PCT/KR2019/011837, filed on Sep. 11, 2019, which claims the benefit under 35 USC 119 (a) and 365 (b) of Korean Patent Application No. 10-2018-0108607, filed on Sep. 11, 2018, Korean Patent Application No. 10-2018-0110173, filed on Sep. 14, 2018 and Korean Patent Application No. 10-2018-0114538, filed on Sep. 24, 2018, in the Korean Intellectual Property Office, the entire disclosure of which is incorporated herein by reference for all purposes.

TECHNICAL FIELD

The present invention relates to an image encoding/decoding method and apparatus.

BACKGROUND ART

Recently, demand for high-resolution and high-quality images such as high definition (HD) images and ultra high definition (UHD) images is increasing in various application fields, and accordingly, high-efficiency image compression techniques are being discussed.

Various technologies exist, such as the inter prediction technology that predicts pixel values included in a current picture from a picture before or after a current picture using video compression technology, the intra prediction technology that predicts pixel values included in a current picture by using pixel information in a current picture, an entropy encoding technology that allocates a short code to a value with a high frequency of appearance and a long code to a value with a low frequency of appearance. Image data can be effectively compressed by using such image compression technology, and transmitted or stored.

DISCLOSURE

Technical Problem

An object of the present invention is to provide a method and apparatus for deriving motion information according to a predetermined inter mode.

An object of the present invention is to provide a method and apparatus for adaptively adjusting a resolution or precision of a motion vector.

An object of the present invention is to provide an interpolation-based motion compensation method and apparatus.

Technical Solution

An image encoding/decoding method and apparatus of the present invention may derive motion information of a current block, and perform motion compensation for the current block based on the motion information.

In an image encoding/decoding method and apparatus of the present invention, the motion information of the current block may be derived based on an inter mode pre-defined in a decoding apparatus, and the pre-defined inter mode may include at least one of a merge mode, an AMVP mode, an affine mode or an intra block copy mode (IBC mode).

In an image encoding/decoding method and apparatus of the present invention, the deriving motion information may comprise, determining a resolution of a motion vector of the current block, deriving a motion vector predictor corresponding to the resolution, rounding a motion vector difference of the current block based on the resolution, and deriving a motion vector of the current block based on the derived motion vector predictor and the rounded motion vector difference.

In an image encoding/decoding method and apparatus of the present invention, the resolution may be determined as a resolution candidate specified by a predetermined index from among a plurality of resolution candidates pre-defined in the decoding apparatus.

In an image encoding/decoding method and apparatus of the present invention, the plurality of pre-defined resolution candidates may include at least one of 1/16 pixel, 1/8 pixel, 1/4 pixel, 1/2 pixel, 1 pixel, 2 pixel, or 4 pixel.

In an image encoding/decoding method and apparatus of the present invention, the plurality of resolution candidates may be defined differently for each of the pre-defined inter mode.

In an image encoding/decoding method and apparatus of the present invention, the motion information may be derived from a merge candidate list of the current block, the merge candidate list may include at least one of a spatial merge candidate, a temporal merge candidate, or a combined merge candidate.

In an image encoding/decoding method and apparatus of the present invention, the combined merge candidate may be derived by a weighted average of motion information of a plurality of merge candidates pre-added to the merge candidate list.

In an image encoding/decoding method and apparatus of the present invention, the combined merge candidate may be derived in consideration of prediction directions of the plurality of merge candidates.

In an image encoding/decoding method and apparatus of the present invention, the performing motion compensation may comprise, determining an interpolation filter of the current block, determining a position of a reference integer pixel, and deriving a prediction pixel of the current block by applying the interpolation filter to the reference integer pixel.

In an image encoding/decoding method and apparatus of the present invention, when a fractional pixel to be interpolated corresponds to a 1/2 pixel, one of a plurality of interpolation filters pre-defined in a decoding apparatus may be selectively used.

In an image encoding/decoding method and apparatus of the present invention, the interpolation filter of the current block may be determined as one of the plurality of interpolation filters in consideration of the determined resolution.

In an image encoding/decoding method and apparatus of the present invention, the position of the reference integer pixel may be determined in consideration of a position of the sub-picture.

Advantageous Effects

According to the present invention, motion information according to an inter mode may be efficiently derived.

The present invention may adaptively adjust a resolution or precision of a motion vector.

The present invention may improve the efficiency of motion compensation through selective use of an interpolation filter.

The present invention may improve the efficiency of inter prediction encoding/decoding through adaptive block division.

DESCRIPTION OF DRAWINGS

FIG. 3 illustrates a block division type according to an embodiment to which the present invention is applied.

BEST MODE FOR INVENTION

Figure 1:
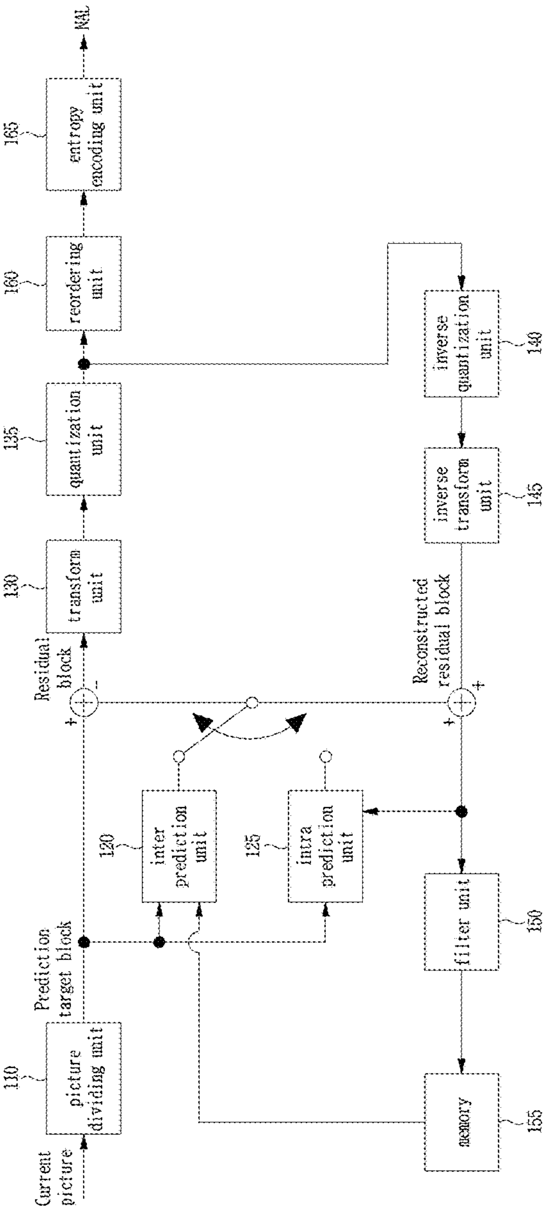
FIG. 1 is a block diagram illustrating an image encoding apparatus according to an embodiment of the present invention.

An image encoding/decoding method and apparatus of the present invention may derive motion information of a current block, and perform motion compensation for the current block based on the motion information.

In an image encoding/decoding method and apparatus of the present invention, the motion information of the current block may be derived based on an inter mode pre-defined in a decoding apparatus, and the pre-defined inter mode may include at least one of a merge mode, an AMVP mode, an affine mode or an intra block copy mode (IBC mode).

In an image encoding/decoding method and apparatus of the present invention, the deriving motion information may comprise, determining a resolution of a motion vector of the current block, deriving a motion vector predictor corresponding to the resolution, rounding a motion vector difference of the current block based on the resolution, and deriving a motion vector of the current block based on the derived motion vector predictor and the rounded motion vector difference.

In an image encoding/decoding method and apparatus of the present invention, the resolution may be determined as a resolution candidate specified by a predetermined index from among a plurality of resolution candidates pre-defined in the decoding apparatus.

In an image encoding/decoding method and apparatus of the present invention, the plurality of pre-defined resolution candidates may include at least one of 1/16 pixel, 1/8 pixel, 1/4 pixel, 1/2 pixel, 1 pixel, 2 pixel, or 4 pixel.

In an image encoding/decoding method and apparatus of the present invention, the plurality of resolution candidates may be defined differently for each of the pre-defined inter mode.

In an image encoding/decoding method and apparatus of the present invention, the motion information may be derived from a merge candidate list of the current block, the merge candidate list may include at least one of a spatial merge candidate, a temporal merge candidate, or a combined merge candidate.

In an image encoding/decoding method and apparatus of the present invention, the combined merge candidate may be derived by a weighted average of motion information of a plurality of merge candidates pre-added to the merge candidate list.

In an image encoding/decoding method and apparatus of the present invention, the combined merge candidate may be derived in consideration of prediction directions of the plurality of merge candidates.

In an image encoding/decoding method and apparatus of the present invention, the performing motion compensation may comprise, determining an interpolation filter of the current block, determining a position of a reference integer pixel, and deriving a prediction pixel of the current block by applying the interpolation filter to the reference integer pixel.

In an image encoding/decoding method and apparatus of the present invention, when a fractional pixel to be interpolated corresponds to a 1/2 pixel, one of a plurality of interpolation filters pre-defined in a decoding apparatus may be selectively used.

In an image encoding/decoding method and apparatus of the present invention, the interpolation filter of the current block may be determined as one of the plurality of interpolation filters in consideration of the determined resolution.

In an image encoding/decoding method and apparatus of the present invention, the position of the reference integer pixel may be determined in consideration of a position of the sub-picture.

MODE FOR INVENTION

The present invention may be changed and modified variously and be illustrated with reference to different exemplary embodiments, some of which will be described and shown in the drawings. However, these embodiments are not intended for limiting the invention but are construed as including includes all modifications, equivalents and replacements which belong to the spirit and technical scope of the invention. Like reference numerals in the drawings refer to like elements throughout.

Although the terms first, second, etc. may be used to describe various elements, these elements should not be limited by these terms. These terms are used only to distinguish one element from another element. For example, a first element could be termed a second element and a second element could be termed a first element likewise without departing from the teachings of the present invention. The term "and/or" includes any and all combinations of a plurality of associated listed items.

It will be understood that when an element is referred to as being "connected to" or "coupled to" another element, the element can be directly connected or coupled to another element or intervening elements. On the contrary, when an element is referred to as being "directly connected to" or "directly coupled to" another element, there are no intervening elements present.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "include" and/or "have," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the invention will be described in detail with reference to the accompanying drawings. Like reference numerals in the drawings refer to like elements throughout, and redundant descriptions of like elements will be omitted herein.

FIG. 1 is a block diagram illustrating an image encoding apparatus according to an embodiment of the present invention.

Referring to FIG. 1, the image encoding apparatus 100 includes a picture dividing unit 110, prediction units 120 and 125, a transform unit 130, a quantization unit 135, a reordering unit 160, an entropy encoding unit 165, an inverse quantization unit 140, an inverse transform unit 145, a filter unit 150, and a memory 155.

Each of the elements shown in FIG. 1 is shown independently to represent different characteristic functions in the encoding apparatus, and does not mean that each element is made up of separate hardware or one software element. That is, the elements are independently arranged for convenience of description, wherein at least two elements may be combined into a single element, or a single element may be divided into a plurality of elements to perform functions. It is to be noted that embodiments in which some elements are integrated into one combined element and/or an element is divided into multiple separate elements are included in the scope of the present invention without departing from the essence of the present invention.

Some elements are not essential to the substantial functions in the invention and may be optional constituents for merely improving performance. The invention may be embodied by including only constituents essential to embodiment of the invention, except for constituents used to merely improve performance. The structure including only the essential constituents except for the optical constituents used to merely improve performance belongs to the scope of the invention.

The picture dividing unit 110 may divide the input picture into at least one processing unit. In this case, the processing unit may be a prediction unit (PU), a transform unit (TU), or a coding unit (CU). The picture dividing unit 110 may divide one picture into a plurality of combinations of a coding unit, a prediction unit, and a transformation unit, and select one combination of a coding unit, a prediction unit, and a transformation unit based on a predetermined criterion (for example, a cost function) to encode the picture.

For example, one picture may be divided into a plurality of coding units. In order to divide a picture into the coding units, a recursive tree structure such as a quad tree structure may be used. One image or a maximum coding block (largest coding unit) as a root may be divided into other coding units, and may be divided with as many child nodes as the number of divided coding units. A coding unit that are no longer divided according to certain restrictions become a leaf node. That is, when it is assumed that only square division is possible for one coding unit, one coding unit may be divided into up to four different coding units.

In the embodiments of the invention, a coding unit may be used to refer to not only a unit of encoding but also a unit of decoding.

The prediction unit may be a block divided in a shape such as at least one square or rectangle of the same size within one coding unit, or one prediction unit among the prediction units divided within one coding unit may have a different shape and/or size from another prediction unit.

When a prediction unit that performs intra prediction based on a coding unit is not a minimum coding unit, intra prediction may be performed without dividing into a plurality of prediction units N×N.

The prediction units 120 and 125 may include an inter prediction unit 120 to perform inter prediction and an intra prediction unit 125 to perform intra prediction. The prediction units 120 and 125 may determine which of inter prediction and intra prediction is performed on a PU, and may determine specific information (for example, an intra prediction mode, a motion vector, and a reference picture) of the determined prediction method. Here, a processing unit on which prediction is performed may be different from a processing unit for which a prediction method and specific information thereon are determined. For example, a prediction method and a prediction mode may be determined for each PU, while prediction may be performed for each TU. A residual value (residual block) between a generated predicted block and an original block may be input to the transform unit 130. Further, prediction mode information, motion vector information and the like used for prediction may be encoded along with the residual value by the entropy encoding unit 165 and be transmitted to the decoding apparatus. When a specific encoding mode is used, the original block may be encoded and transmitted to the decoding apparatus without generating a prediction block by the prediction units 120 and 125.

The inter prediction unit 120 may predict a PU based on information on at least one picture among a previous picture of a current picture and a subsequent picture of a current picture. In some cases, the inter prediction unit 120 may predict a PU based on information of a partially encoded region in the current picture. The inter prediction unit 120 may include a reference picture interpolation unit, a motion prediction unit, and a motion compensation unit.

The reference picture interpolation unit may be supplied with reference picture information from the memory 155 and generate pixel information less than or equal to an integer pixel on a reference picture. In the case of luma pixels, a DCT-based 8-tap interpolation filter with a variable filter coefficient may be used to generate pixel information less than or equal to an integer pixel in a unit of a ¼ pixel. In the case of chrominance pixels, a DCT-based 4-tap interpolation filter with a variable filter coefficient may be used to generate pixel information less than or equal to an integer pixel in a unit of a ⅛ pixel.

The motion prediction unit may perform motion prediction on the basis of the reference picture interpolated by the reference picture interpolation unit. Various methods, such as a full search-based block matching algorithm (FBMA), a three-step search (TSS) algorithm and a new three-step search (NTS) algorithm, may be used to calculate a motion vector. A motion vector has a motion vector value in the unit of a ½ or ¼ pixel on the basis of an interpolated pixel. The motion prediction unit may predict a current PU using different motion prediction methods. Various methods, such as skip mode, merge mode, advanced motion vector prediction (AMVP) mode, and intra block copy mode, etc. may be used as the motion prediction method.

The intra prediction unit 125 may generate a PU on the basis of information on a reference pixel neighboring to a current block. When a reference pixel is a pixel for which inter prediction has been performed because a block neighboring to the current PU is a block for which inter prediction has been performed, information on a reference pixel in the block for which inter prediction has been performed may be replaced with information on a reference pixel in a block for which intra prediction has been performed. That is, when a reference pixel is not available, information on the unavailable reference pixel may be replaced with information on at least one reference pixel of the available reference pixels.

A prediction mode of intra prediction includes a directional prediction mode in which reference pixel information is used according to a prediction direction and a non-directional prediction mode in which information on direction is not used in performing prediction. A mode for predicting luma information and a mode for predicting chroma information may be different from each other. Further, intra prediction mode information used to predict luma information or the predicted luma signal information may be used to predict chroma information.

When the size of the prediction unit and the size of the transform unit are the same in performing intra prediction, intra prediction for the prediction unit may be performed based on a pixel on the left, a pixel on the top-left, and a pixel on the top of the prediction unit. However, when the size of the prediction unit and the size of the transform unit are different in performing intra prediction, intra prediction may be performed using a reference pixel determined based on the transform unit. Also, intra prediction using N×N division may be used for only the minimum coding unit.

In the intra prediction method, a predicted block may be generated by applying an adaptive intra smoothing (AIS) filter to the reference pixels according to the prediction mode. Different types of AIS filters may be applied to the reference pixels. In the intra prediction method, the intra prediction mode of a current PU may be predicted from an intra prediction mode of a PU neighboring to the current PU. In predicting the prediction mode of the current PU using mode information predicted from a neighboring PU, when the current PU and the neighboring PU have the same intra prediction mode, information indicating that the current PU and the neighboring PU have the same prediction mode may be transmitted using predetermined flag information. When the current PU and the neighboring PU have different prediction modes, information on the prediction mode of the current block may be encoded by entropy encoding.

A residual block including residual information may be generated. The residual information is a difference between a predicted unit generated by the prediction units 120 and 125 and an original block of the prediction unit. The generated residual block may be input to the transform unit 130.

The transform unit 130 may transform the residual block including the residual information between the predicted unit generated by the prediction units 120 and 125 and the original block by using a transform type such as DCT (Discrete Cosine Transform), DST (Discrete Sine Transform), or KLT. Whether to apply DCT, DST, or KLT to transform the residual block may be determined based on intra prediction mode information of the prediction unit used to generate the residual block.

The quantization unit 135 may quantize values transformed into a frequency domain by the transform unit 130. A quantization coefficient may be changed depending on a block or importance of an image. Values output from the quantization unit 135 may be provided to the inverse quantization unit 140 and the rearrangement unit 160.

The rearrangement unit 160 may perform the rearrangement of the coefficient values for the quantized residual.

The rearrangement unit 160 may change coefficients of a two-dimensional (2D) block into coefficients of a one-dimensional (1D) vector through coefficient scanning method. For example, the rearrangement unit 160 may scan a DC coefficient to a coefficient in the high-frequency region using Zig-Zag scan method, and change it into a one-dimensional vector form. Depending on the size of the transform unit and the intra prediction mode, instead of zig-zag scan, a vertical scan that scans a two-dimensional block shape coefficient in a column direction and a horizontal scan that scans a two-dimensional block shape coefficient in a row direction may be used. That is, according to the size of the transform unit and the intra prediction mode, it is possible to determine which of a zig-zag scan, a vertical direction scan, and a horizontal direction scan is to be used.

The entropy encoding unit 165 may perform entropy encoding on the basis of the values obtained by the rearrangement unit 160. Various encoding methods, such as exponential Golomb coding, context-adaptive variable length coding (CAVLC), or context-adaptive binary arithmetic coding (CABAC), may be used for entropy encoding.

The entropy encoding unit 165 may encode a variety of information, such as residual coefficient information and block type information of a coding unit, prediction mode information, division unit information, prediction unit information, transfer unit information, motion vector information, reference frame information, block interpolation information and filtering information from the rearrangement unit 160 and the prediction units 120 and 125.

The entropy encoding unit 165 may entropy-encode coefficients of a CU input from the rearrangement unit 160.

The inverse quantization unit 140 and the inverse transform unit 145 dequantize the values which are quantized by the quantization unit 135 and inverse-transform the values which are transformed by the transform unit 130. A reconstructed block may be generated by adding the residual values to the predicted PU. The residual values may be generated by the inverse quantization unit 140 and the inverse transform unit 145. The predicted PU may be predicted by the motion vector prediction unit, the motion compensation unit, and the intra prediction unit of the prediction units 120 and 125.

The filter unit 150 may include at least one of a deblocking filter, an offset unit, and an adaptive loop filter (ALF).

The deblocking filter may remove block distortion generated by boundaries between blocks in a reconstructed picture. Whether to apply the deblocking filter to a current block may be determined on the basis of pixels included in several rows or columns of the block. When the deblocking filter is applied to a block, a strong filter or a weak filter may be applied depending on a required deblocking filtering strength. When horizontal filtering and vertical filtering are performed in applying the deblocking filter, the horizontal filtering and vertical filtering may be performed in parallel.

The offset unit may apply the offset with respect to the original image to the deblocking filtered image, in units of pixels. A region to which the offset may be applied may be determined after partitioning pixels of a picture into a predetermined number of regions. The offset may be applied to the determined region in consideration of edge information on each pixel or the method of applying the offset to the determined region.

The ALF may perform filtering based on a comparison result of the filtered reconstructed image and the original image. Pixels included in an image may be partitioned into predetermined groups, a filter to be applied to each group may be determined, and differential filtering may be performed for each group. Information on whether to apply the ALF may be transferred by each coding unit (CU) and a shape and filter coefficients of an ALF to be applied to each block may vary. Further, an ALF with the same form (fixed form) may be applied to a block regardless of characteristics of the block.

The memory 155 may store a reconstructed block or picture output from the filter unit 150, and the stored reconstructed block or picture may be supplied to the prediction units 120 and 125 when performing inter prediction.

Figure 2:
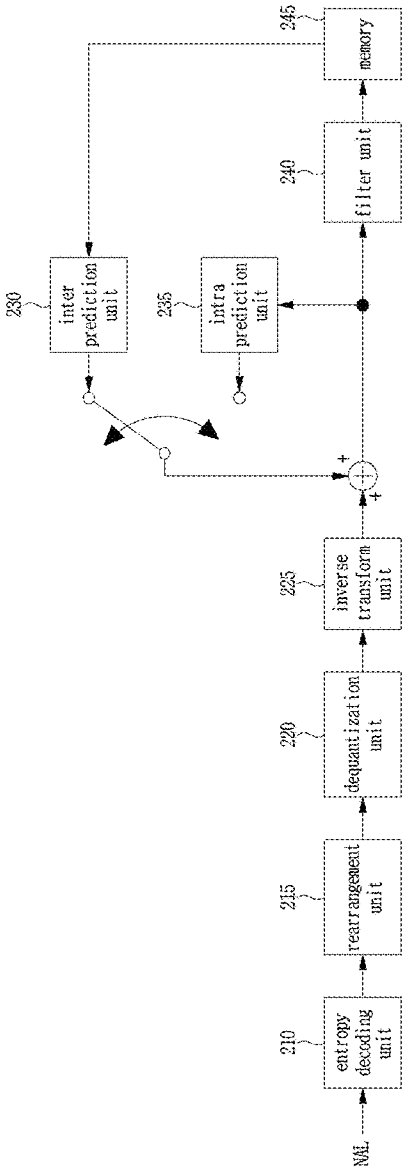
FIG. 2 is a block diagram illustrating an image decoding apparatus according an exemplary embodiment of the present invention.

FIG. 2 is a block diagram illustrating an image decoding apparatus according an exemplary embodiment of the present invention.

Referring to FIG. 2, the image decoding apparatus 200 may include an entropy decoding unit 210, a rearrangement unit 215, a dequantization unit 220, an inverse transform unit 225, prediction units 230 and 235, a filter unit 240, and a memory 245.

When an image bitstream is input from the image encoding apparatus, the input bitstream may be decoded in a procedure opposite to that of the image encoding apparatus.

The entropy decoding unit 210 may perform entropy decoding in a procedure opposite to that of performing entropy encoding in an entropy encoding unit of an image encoding apparatus. For example, various methods, such as exponential Golomb coding, CAVLC or CABAC, may be applied corresponding to the method performed by the image encoding apparatus.

The entropy decoding unit 210 may decode information associated with intra prediction and inter prediction performed by the encoding apparatus.

The rearrangement unit 215 may perform rearrangement on the bitstream entropy-decoded by the entropy decoding unit 210 based on the rearrangement method of the encoding apparatus. The rearrangement unit 215 may reconstruct and rearrange coefficients of a 1D vector into coefficients of a 2D block. The rearrangement unit 215 may be provided with information on coefficient scanning performed by the encoding apparatus and may perform rearrangement using a method of inversely scanning the coefficients, on the basis of scanning order performed by the encoding apparatus.

The dequantization unit 220 may perform dequantization on the basis of a quantization parameter provided by the encoding apparatus and the rearranged coefficients of the block.

The inverse transform unit 225 may perform an inverse transform, that is, an inverse DCT, an inverse DST, and an inverse KLT, with respect to the transform performed by the transform unit, that is, DCT, DST, and KLT on the quantization result performed by the image encoding apparatus. The inverse transform may be performed based on a transmission unit determined by the image encoding apparatus. The inverse transform unit 225 of the image decoding apparatus may selectively perform a transform technique (e.g., DCT, DST, KLT) according to a plurality of pieces of information such as a prediction method, a size of a current block, and a prediction direction.

The prediction units 230 and 235 may generate a prediction block on the basis of information for generating prediction block and information on a previously-decoded block or picture provided. The information for generating prediction block may be provided from the entropy decoding unit 210. The information on a previously-decoded block or picture may be provided from the memory 245.

As described above, when the size of the prediction unit and the size of the transform unit are the same when intra prediction is performed in the same manner as the operation of the image encoding apparatus, intra prediction for the prediction unit may be performed based on a pixel on the left, a pixel on the top-left, and a pixel on the top of the prediction unit. However, when the size of the prediction unit and the size of the transform unit are different from each other when performing intra prediction, the intra prediction for the prediction unit may be performed using a reference pixel determined based on the transform unit. In addition, intra prediction using N×N division may be used for only the minimum coding unit.

The prediction units 230 and 235 may include a prediction unit determination unit, an inter prediction unit and an intra prediction unit. The prediction unit determination unit may receive a variety of information, such as prediction unit information, prediction mode information of an intra prediction method and motion prediction-related information of an inter prediction method, etc. from the entropy decoding unit 210, may determine a prediction unit for a current coding unit. The prediction unit determination unit may determine which of the inter prediction and the intra prediction is performed on the prediction unit. An inter prediction unit 230 may perform inter prediction on a current prediction unit on the basis of information on at least one picture among a previous picture and a subsequent picture of a current picture including the current prediction unit. Herein, an inter prediction unit 230 may use information necessary for inter prediction for the current prediction unit provided from the image encoding apparatus. The inter prediction may be performed on the basis of the information of the pre-reconstructed partial region in the current picture including the current prediction unit.

In order to perform inter prediction, it may be determined, in a unit of a coding unit, whether a motion prediction method for a prediction unit included in the coding unit is a skip mode, a merge mode, an AMVP mode or an intra block copy mode.

An intra prediction unit 235 may generate a prediction block on the basis of pixel information in a current picture. When a prediction unit is a prediction unit for which intra prediction is performed, intra prediction may be performed based on intra prediction mode information on the prediction unit provided from the image encoding apparatus. The intra prediction unit 235 may include an AIS (Adaptive Intra Smoothing) filter, a reference pixel interpolation unit, and a DC filter. The AIS filter performs filtering on reference pixels of a current block. The AIS filter may decide whether to apply the filter or not, depending on a prediction mode for the current prediction unit. AIS filtering may be performed on the reference pixels of the current block using the prediction mode for the prediction unit and information on the AIS filter provided from the image encoding apparatus. When the prediction mode for the current block is a mode not performing AIS filtering, the AIS filter may not be applied.

When the prediction mode for the prediction unit indicates a prediction mode of performing intra prediction based on pixel values obtained by interpolating the reference pixels, the reference pixel interpolation unit may generate reference pixels in a unit of a fractional pixel less than an integer pixel (i.e., full pixel) by interpolating the reference pixels. When the prediction mode for the current prediction unit indicates a prediction mode of generating a prediction block without interpolating the reference pixels, the reference pixels may not be interpolated. The DC filter may generate a prediction block through filtering when the prediction mode for the current block is the DC mode.

The reconstructed block or picture may be provided to the filter unit 240. The filter unit 240 includes a deblocking filter, an offset unit, and an ALF.

The image encoding apparatus may provide information on whether the deblocking filter is applied to a corresponding block or picture, and information on which of a strong filter and a weak filter is applied when the deblocking filter is used. The deblocking filter of the image decoding apparatus may be provided with information on the deblocking filter from the image encoding apparatus and may perform deblocking filtering on a corresponding block.

The offset unit may apply offset to the reconstructed picture on the basis of information on an offset type and offset value applied to the picture in the encoding process.

The ALF may be applied to a coding unit on the basis of information on whether the ALF is applied and ALF coefficient information, etc. provided from the encoding apparatus. The ALF information may be included and provided in a specific parameter set.

The memory 245 may store the reconstructed picture or block for use as a reference picture or a reference block and may provide the reconstructed picture to an output unit.

As described above, in an embodiment of the present invention, for convenience of description, a coding unit is used as an encoding unit, but it may be a unit that performs not only encoding but also decoding.

FIG. 3 illustrates a block division type according to an embodiment to which the present invention is applied.

One block (hereinafter, referred to as a first block) may be divided into a plurality of sub-blocks (hereinafter, referred to as a second block) by at least one of a vertical line or a horizontal line. The number of each of the vertical and horizontal lines may be one, two, or more. Here, the first block may be a coding block (CU) which is a basic unit of image encoding/decoding, a prediction block (PU) which is a basic unit of prediction encoding/decoding or a transform block (TU) which is a basic unit of transform encoding/decoding. The first block may be a square block or a non-square block.

The division of the first block may be performed based on a quad tree, a binary tree, a triple tree, etc., and will be described in detail with reference to FIG. 3.

FIG. 3A illustrates a quad tree division (QT). QT is a division type in which the first block is divided into four second blocks. For example, when the first block of 2N×2N is divided by QT, the first block may be divided into four second blocks having N×N size. QT may be limited to apply to a square block only, but it is also applicable to a non-square block.

FIG. 3B illustrates a horizontal binary tree (hereinafter, referred to as Horizontal BT) division. Horizontal BT is a division type in which the first block is divided into two second blocks by one horizontal line. This division may be performed symmetrically or asymmetrically. For example, when the first block of 2N×2N is divided based on Horizontal BT, the first block may be divided into two second blocks with a height ratio of (a:b). Here, a and b may be the same value, and a may be larger or smaller than b.

FIG. 3C illustrates a vertical binary tree (hereinafter, referred to as Vertical BT) division. Vertical BT is a division type in which the first block is divided into two second blocks by one vertical line. This division may be performed symmetrically or asymmetrically. For example, when the first block of 2N×2N is divided based on Vertical BT, the first block may be divided into two second blocks with a width ratio of (a:b). Here, a and b may be the same value, and a may be larger or smaller than b.

FIG. 3D illustrates a horizontal triple tree (hereinafter, referred to as Horizontal TT) division. Horizontal TT is a division type in which the first block is divided into three second blocks by two horizontal lines. For example, when the first block of 2N×2N is divided based on Horizontal TT, the first block may be divided into three second blocks with a height ratio of (a:b:c). Here, a, b, and c may be the same value. Alternatively, a and c may be the same, and b may be greater or less than a.

FIG. 3E illustrates a vertical triple tree (hereinafter, referred to as Vertical TT) division. Vertical TT is a division type in which the first block is divided into three second blocks by two vertical lines. For example, when the first block of 2N×2N is divided based on Vertical TT, the first block may be divided into three second blocks with a width ratio of (a:b:c). Here, a, b, and c may be the same value or different values. Alternatively, a and c may be the same while b may be greater or less than a. Alternatively, a and b may be the same while c may be greater or less than a. Alternatively, b and c are the same while a may be larger or smaller than b.

The division described above may be performed based on the division information signaled from the encoding apparatus. The division information may include at least one of division type information, division direction information, or division ratio information.

The division type information may specify any one of the division types that are pre-defined in the encoding/decoding apparatus. The pre-defined division type may include at least one of QT, Horizontal BT, Vertical BT, Horizontal TT, Vertical TT, or non-division mode (No split). Alternatively, the division type information may mean information on whether or not QT, BT, or TT is applied, and may be encoded in the form of a flag or an index. In the case of BT or TT, the division direction information may indicate whether it is divided horizontally or vertically. In the case of BT or TT, the division ratio information may indicate the ratio of the width and/or the height of the second block.

Figure 4:
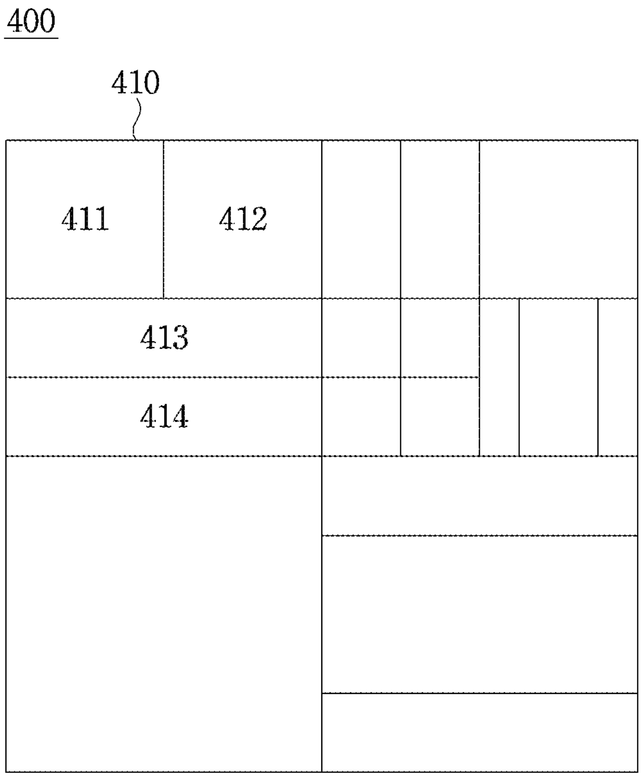
FIG. 4 illustrates a block division method based on a tree structure as an embodiment to which the present invention is applied.

FIG. 4 illustrates a tree structure-based block division method according to an embodiment in which the present invention is applied.

The block 400 illustrated in FIG. 4 is assumed to be a square block (hereinafter, referred to as a first block) having a size of 8N×8N and a division depth k. When the division information of the first block indicates QT division, the first block may be divided into four sub-blocks (hereinafter, referred to as a second block). The second block may have a size of 4N×4N and may have a division depth (k+1).

The four second blocks may be divided again based on either QT, BT, TT, or non-division mode. For example, when the division information of the second block indicates a horizontal binary tree (Horizontal BT), the second block is divided into two sub-blocks (hereinafter, referred to as a third block) as the second block 410 of FIG. 4. At this time, the third block may have a size of 4N×2N and may have a division depth (k+2).

The third block may also be divided again based on either QT, BT, TT, or non-division mode. For example, when the division information of the third block indicates a vertical binary tree (Vertical BT), the third block is divided into two sub-blocks 411 and 412 as illustrated in FIG. 4. At this time, the sub-blocks 411 and 412 may have a size of 2N×2N and a division depth (k+3). Alternatively, when the division information of the third block indicates a horizontal binary tree (Horizontal BT), the third block may be divided into two sub-blocks 413 and 414 as illustrated in FIG. 4. In this case, the sub-blocks 413 and 414 may have a size of 4N×N and a division depth (k+3).

The division may be performed independently or in parallel with the neighboring block, or may be performed sequentially according to a predetermined priority order.

The division information of the current block may be determined depending on at least one of the division information of the upper block of the current block or the division information of the neighboring block. For example, when the second block is divided based on Horizontal BT and the upper third block is divided based on Vertical BT, the lower third block does not need to be divided based on Vertical BT. If the lower third block is divided by Vertical BT, this is the same result as the second block is divided by QT. Therefore, encoding for the division information (particularly, the division direction information) of the lower third block may be skipped, and the decoding apparatus may be set so that the lower third block is divided in the horizontal direction.

The upper block may mean a block having a smaller division depth than the division depth of the current block. For example, when the division depth of the current block is (k+2), the division depth of the upper block may be (k+1). The neighboring block may be a block adjacent to the top or left side of the current block. The neighboring block may be a block having the same division depth as the current block.

The above-described division may be repeatedly performed up to the minimum unit of encoding/decoding. When divided into the minimum unit, the division information for the block is no longer signaled from the encoding apparatus. The information on the minimum unit may include at least one of a size or a shape of the minimum unit. The size of the minimum unit may be expressed by the width, the height, the minimum or maximum value of the width and height, the sum of the width and height, the number of pixels, or the division depth. The information on the minimum unit may be signaled in at least one of a video sequence, a picture, a slice, or a block unit. Alternatively, the information on the minimum unit may be a value pre-defined in the encoding/decoding apparatus. The information on the minimum unit may be signaled for each of CU, PU, and TU. Information on one minimum unit may be applied to CU, PU, and TU equally.

Figure 5:
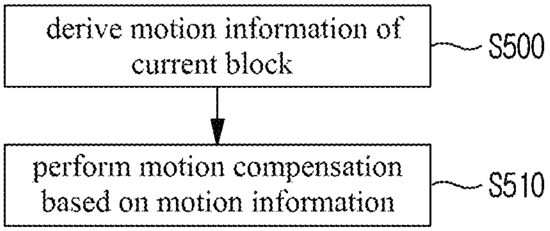
FIG. 5 illustrates an inter prediction method as an embodiment to which the present invention is applied.

FIG. 5 illustrates an inter prediction method as an embodiment to which the present invention is applied.

Referring to FIG. 5, motion information of a current block may be derived (S500).

The motion information may be derived based on an inter mode pre-defined in the encoding/decoding apparatus. The pre-defined inter mode may include at least one of a merge mode, an AMVP mode, an affine mode, or an intra block copy mode. Here, the motion information may be variously interpreted as a motion vector predictor, a motion vector, a control point vector predictor, a control point vector, a block vector, etc., according to the inter mode.

In the merge mode, the motion information of a current block may be set identical to motion information of a merge candidate. In this way, motion information is derived through merging with the merge candidate, and an additional motion vector difference (mvd) is not signaled. A method of deriving motion information based on the merge mode will be described in detail with reference to FIG. 6.

In the AMVP mode, a motion vector of a neighboring block may be set as a motion vector predictor of a current block. To this end, a candidate list including motion vectors of spatial/temporal neighboring blocks may be constructed, and an index specifying any one of a plurality of motion vectors of the candidate list may be signaled. Meanwhile, unlike the merge mode, a motion vector may be reconstructed by adding the motion vector predictor and a signaled motion vector difference.

In addition, an additional motion model may be used in addition to a translation motion model that considers only the translational motion. For example, a motion model that considers movement such as rotation, perspective, and zoom-in/out as well as parallel movement may be used. This may be called affine mode. In the affine mode, motion information may be derived in units of a predetermined sub-block based on a control point vector of a current block. This will be described in detail with reference to FIGS. 7 and 8.

In the case of the IBC mode, it is similar to the AMVP mode in that the motion vector of the neighboring block is set as the block vector predictor (bvp) of the current block, and the block vector is reconstructed using the signaled block vector difference (bvd). However, there is a difference in that the IBC mode performs motion compensation based on a pre-reconstructed region in a picture that is the same as the current block, whereas the AMVP mode performs motion compensation based on a pre-reconstructed region in a picture that is different from the current block.

Meanwhile, the motion information derivation of S500 may further include a process of adjusting a resolution or precision of the motion information, which will be described in detail with reference to FIG. 9.

Referring to FIG. 5, motion compensation may be performed on a current block based on the derived motion information (S510).

A reference block according to a motion vector of the current block may be determined, and a reconstructed pixel of the determined reference block may be set as a prediction pixel of the current block. The reference block may be determined by applying a predetermined interpolation filter to integer pixels and/or fractional pixels in the reference picture. A detailed interpolation method will be described with reference to FIG. 10.

Meanwhile, in case of the affine mode, the reference block may be specified for each sub-block of the current block. The reference block of each sub-block may belong to one reference picture. That is, sub-blocks belonging to the current block may share one reference picture. Alternatively, a reference picture index may be independently set for each subblock of the current block.

Meanwhile, the derived motion vector may include at least one of an L0 motion vector and an L1 motion vector. When the motion vector includes L0 and L1 motion vectors, the decoding apparatus may perform uni-directional prediction by setting one of the L0 and L1 motion vectors to 0.

The setting may be selectively performed in consideration of at least one of the size/shape of the block or the aforementioned inter mode. Here, the block may mean a current block or a sub-block of the current block.

For example, if the size of the current block (or a sub-block of the current block) is less than or equal to a predetermined threshold size, uni-directional prediction may be performed by setting one of the L0 or L1 motion vectors to 0, otherwise, bi-directional prediction may be performed by using the L0 and L1 motion vectors. Here, the threshold size may be defined as a block size in which at least one of the width and height is 4, 8, or 16.

Alternatively, if the type of the sub-block of the current block is non-square or triangular, uni-directional prediction may be performed by setting one of the L0 or L1 motion vectors to 0, otherwise, bi-directional prediction may be performed by using the L0 and L1 motion vectors.

Alternatively, when the current block is encoded in the affine mode or the IBC mode, uni-directional prediction may be performed by setting one of the L0 or L1 motion vectors to 0, otherwise, bi-directional prediction may be performed by using the L0 and L1 motion vectors.

Figure 6:
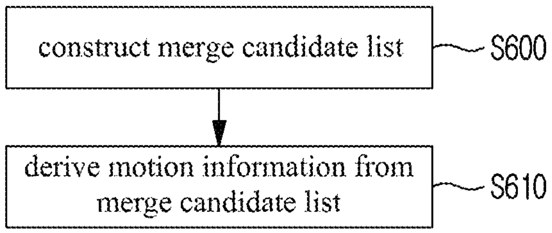
FIG. 6 illustrates a method of deriving motion information according to a merge mode as an embodiment to which the present invention is applied.

FIG. 6 illustrates a method of deriving motion information according to a merge mode as an embodiment to which the present invention is applied.

Referring to FIG. 6, a merge candidate list of a current block may be constructed (S600).

The merge candidate list may include at least one of a spatial merge candidate or a temporal merge candidate of the current block.

Motion information of the spatial merge candidate may be derived from motion information of a spatial neighboring block of the current block. Here, the spatial neighboring block is a block belonging to the same picture as the current block, and may mean a block adjacent to the current block. The spatial neighboring block may include a block adjacent to at least one of a left, top, right, bottom, left, or top-left of the current block. The top-left neighboring block may be used only when at least one of the blocks adjacent to the left, top, right, and bottom-left is not available.

The motion information of the temporal merge candidate may be derived from motion information of a temporal neighboring block of the current block. The temporal neighboring block is a block belonging to a picture different from the current block, and may be defined as a block at the same position as the current block. Here, the block at the same position may mean at least one of a block BR adjacent to a bottom-right corner of the current block, a block CTR including a position of a center sample of the current block, or a block TL including a position of the top-left sample of the current block. Alternatively, the block at the same position may mean a block including a position shifted by a predetermined disparity vector from the position of the top-left sample of the current block. Here, the disparity vector may be determined based on any one of the motion vectors of the spatial neighboring block described above. Alternatively, the disparity vector may be determined based on a combination of at least two of the motion vectors of the spatial neighboring blocks described above. The combination may mean an operation such as a maximum value, a minimum value, a median value, and a weighted average value. For example, the disparity vector may be set as a motion vector of a left neighboring block or a top neighboring block. Alternatively, the disparity vector may be set as the median value or average value between a motion vector of the left neighboring block and a motion vector of a bottom-left neighboring block.

A motion vector and a reference picture index of the temporal merge candidate may be derived from a motion vector and a reference picture index of the above-described temporal neighboring block, respectively. Alternatively, the motion vector of the temporal merge candidate may be derived as the motion vector of the temporal neighboring block, and the reference picture index of the temporal merge candidate may be set to a default value (e.g., 0) pre-committed to the decoding apparatus regardless of the temporal neighboring block.

The merge candidate list may further include a combined merge candidate. The combined merge candidate may be derived by combining n merge candidates belonging to a pre-generated merge candidate list.

Here, n may be an integer of 2, 3, 4 or more. The number n of merge candidates to be combined may be a fixed value pre-committed to the encoding/decoding apparatus, or may be encoded and signaled by the encoding apparatus. The signaling may be performed in at least one unit of a sequence, a picture, a slice, a tile, a sub-tile (brick), or a predetermined block. The number n of merge candidates to be combined may be variably determined based on the number of remaining merge candidates. Here, the number of remaining merge candidates may mean a difference between a maximum number of merge candidates that can be included in the merge candidate list and a current number of merge candidates in the merge candidate list. The maximum number may be a number pre-committed to the encoding/decoding apparatus, or may be encoded and signaled by the encoding apparatus. The current number may mean the number of merge candidates constructed before adding the combined merge candidate. For example, when the number of remaining merge candidates is 1, two merge candidates may be used, and when the number of remaining merge candidates is greater than 1, three or more merge candidates may be used.

The positions of the n merge candidates may be predetermined positions in the merge candidate list. For example, indexes (0 to (k−1)) may be allocated for each merge candidate belonging to the merge candidate list. Here, the k may mean the total number of merge candidates included in the merge candidate list. In this case, the positions of n merge candidates may correspond to index 0 to index (n−1) in the merge candidate list. Alternatively, the n merge candidates may be determined in consideration of a prediction direction of each merge candidate included in the merge candidate list. For example, from among merge candidates included in the merge candidate list, only a merge candidate that is a bi-directional prediction may be selectively used, or only a merge candidate that is a uni-directional prediction may be selectively used.

The combined merge candidate may be derived using both the spatial merge candidate and the temporal merge candidate, or may be derived using only one of the spatial merge candidate or the temporal merge candidate. For example, the combined merge candidate may be limited to be derived using only the spatial merge candidate. In this case, the number of merge candidates to be combined may be limited within the number of spatial merge candidates belonging to the pre-generated merge candidate list.

The combined merge candidate may be added after the spatial/temporal merge candidate in the merge candidate list. That is, an index of the combined merge candidate may be larger than an index of the spatial/temporal merge candidate. Alternatively, the combined merge candidate may be added between the spatial merge candidate and the temporal merge candidate in the merge candidate list. That is, the index of the combined merge candidate may be larger than the index of the spatial merge candidate and smaller than the index of the temporal merge candidate. Alternatively, a position of the combined merge candidate may be variably determined in consideration of a prediction direction of the combined merge candidate. The position of the combined merge candidate in the merge candidate list may be rearranged depending on whether the prediction direction of the combined merge candidate is bi-directional prediction. For example, when the combined merge candidate is the bi-directional prediction, an index smaller than the spatial or temporal merge candidate may be allocated, otherwise, an index larger than the spatial or temporal merge candidate may be allocated.

Hereinafter, for convenience of explanation, a method of deriving a combined merge candidate based on two merge candidates will be described.

Motion information of the combined merge candidate may be derived by a weighted average of motion information of a first merge candidate and a second merge candidate. Here, the weight of the weighted average is [1:1], [1:2], [1:3], [2:3], etc., but is not limited thereto. The weight may be pre-defined in the encoding/decoding apparatus or derived from the decoding apparatus. In this case, the weight may be derived by considering at least one of a distance between a current picture and a reference picture of the merge candidate, or a prediction direction of the merge candidate. Alternatively, motion information of the combined merge candidate may be derived by obtaining motion information in a L0 direction from the first merge candidate and motion information in a L1 direction from the second merge candidate and combining them. Motion information of the combined merge candidate may be derived based on at least one of the above-described derivation methods, and this may be performed in consideration of the prediction direction of the merge candidate to be combined, as described later.

In this specification, the motion information may include at least one of a prediction direction flag, a reference picture index, or a motion vector. Each of the motion information may be defined for L0 prediction and L1 prediction. Here, L0 prediction may mean prediction referring to a reference picture list L0, and L1 prediction may mean prediction referring to a reference picture list L1.

1. When Both the First Merge Candidate and the Second Merge Candidate are One-Way Prediction (CASE 1) When the first merge candidate is the L0 prediction and the second merge candidate is the L1 prediction, a reference picture index of the combined merge candidate in the L0 direction may be derived as a reference picture index of the first merge candidate. A prediction direction flag in the L0 direction of the combined merge candidate may be derived as 1. A motion vector of the combined merge candidate in the L0 direction may be derived as a motion vector of the first merge candidate. A reference picture index in the L1 direction of the combined merge candidate may be derived as a reference picture index of the second merge candidate. A prediction direction flag in the L1 direction of the combined merge candidate may be derived as 1. A motion vector of the combined merge candidate in the L1 direction may be derived as a motion vector of the second merge candidate.

(CASE 2) When the first merge candidate is the L1 prediction and the second merge candidate is the L0 prediction, the reference picture index of the combined merge candidate in the L0 direction may be derived as the reference picture index of the second merge candidate. The prediction direction flag in the L0 direction of the combined merge candidate may be derived as 1. The motion vector of the combined merge candidate in the L0 direction may be derived as a motion vector of the second merge candidate. The reference picture index in the L1 direction of the combined merge candidate may be derived as the reference picture index of the first merge candidate. The prediction direction flag in the L1 direction of the combined merge candidate may be derived as 1. The motion vector of the combined merge candidate in the L1 direction may be derived as the motion vector of the first merge candidate.

(CASE 3) When the first merge candidate and the second merge candidate are the L0 prediction, the reference picture index of the combined merge candidate in the L0 direction may be derived as a reference picture index of any one of the first merge candidate or the second merge candidate. For example, a reference picture index of a merge candidate having the smallest index among the first merge candidate and the second merge candidate may be set as the reference picture index in the L0 direction of the combined merge candidate. The prediction direction flag in the L0 direction of the combined merge candidate may be derived as 1. The motion vector of the combined merge candidate in the L0 direction may be derived as a weighted average of the motion vector of the first merge candidate and the second merge candidate. The reference picture index in the L1 direction of the combined merge candidate may be derived as −1, the prediction direction flag in the L1 direction may be derived as 0, and motion information in the L1 direction may be derived as 0.

(CASE 4) When the first merge candidate and the second merge candidate are the L1 prediction, the reference picture index of the combined merge candidate in the L0 direction may be derived as −1, the prediction direction flag in the L0 direction may be derived as 0, and the motion information in the L0 direction may be derived as 0. The reference picture index of the combined merge candidate in the L1 direction may be derived as a reference picture index of either the first merge candidate or the second merge candidate. For example, a reference picture index of a merge candidate having the smallest index among the first and second merge candidates may be set as the reference picture index of the combined merge candidate in the L1 direction. The prediction direction flag in the L1 direction of the combined merge candidate may be derived as 1. The motion vector of the combined merge candidate in the L1 direction may be derived as a weighted average of the motion vector of the first merge candidate and the second merge candidate.

2. When Both the First Merge Candidate and the Second Merge Candidate are Bi-Directional Prediction (CASE 5) The reference picture index of the combined merge candidate in the L0 direction may be derived as a reference picture index of either the first merge candidate or the second merge candidate. For example, a reference picture index of a merge candidate having the smallest index among the first merge candidate and the second merge candidate may be set as the reference picture index in the L0 direction of the combined merge candidate. The prediction direction flag in the L0 direction of the combined merge candidate may be derived as 1. The motion vector of the combined merge candidate in the L0 direction may be derived as a weighted average of the motion vector of the first merge candidate and the second merge candidate. The reference picture index of the combined merge candidate in the L1 direction may be derived as a reference picture index of either the first merge candidate or the second merge candidate. For example, a reference picture index of a merge candidate having the smallest index among the first merge candidate and the second merge candidate may be set as the reference picture index of the combined merge candidate in the L1 direction. The prediction direction flag in the L1 direction of the combined merge candidate may be derived as 1. The motion vector of the combined merge candidate in the L1 direction may be derived as a weighted average of the motion vector of the first merge candidate and the second merge candidate.

3. When the First Merge Candidate is Bi-Directional Prediction and the Second Merge Candidate is Uni-Directional Prediction (CASE 6) When the second merge candidate is the L0 prediction, the reference picture index of the combined merge candidate in the L0 direction may be derived as a reference picture index of either the first merge candidate or the second merge candidate. For example, a reference picture index of a merge candidate having the smallest index among the first merge candidate and the second merge candidate may be set as the reference picture index in the L0 direction of the combined merge candidate. The prediction direction flag in the L0 direction of the combined merge candidate may be derived as 1. The motion vector of the combined merge candidate in the L0 direction may be derived as a weighted average of the motion vector of the first merge candidate and the second merge candidate. The reference picture index in the L1 direction of the combined merge candidate may be derived as the reference picture index of the first merge candidate. The prediction direction flag in the L1 direction of the combined merge candidate may be derived as 1. The motion vector of the combined merge candidate in the L1 direction may be derived as a motion vector of the first merge candidate.

(CASE 7) When the second merge candidate is the L1 prediction, the reference picture index of the combined merge candidate in the L0 direction may be derived as the reference picture index of the first merge candidate. The prediction direction flag in the L0 direction of the combined merge candidate may be derived as 1. The motion vector of the combined merge candidate in the L0 direction may be derived as the motion vector of the first merge candidate. The reference picture index of the combined merge candidate in the L1 direction may be derived as a reference picture index of either the first merge candidate or the second merge candidate. For example, a reference picture index of a merge candidate having the smallest index among the first and second merge candidates may be set as the reference picture index of the combined merge candidate in the L1 direction. The prediction direction flag in the L1 direction of the combined merge candidate may be derived as 1. The motion vector of the combined merge candidate in the L1 direction may be derived as a weighted average of the motion vector of the first merge candidate and the second merge candidate.

Referring to FIG. 6, motion information of the current block may be derived from the merge candidate list (S610).

Specifically, a merge index of the current block may be signaled. The merge index may specify any one of a plurality of merge candidates belonging to the merge candidate list. A merge candidate having the same index as the merge index may be extracted, and motion information of the current block may be derived using motion information of the extracted merge candidate. For example, a motion vector, a reference picture index, and prediction direction information of the current block may be set to be the same as a motion vector, a reference picture index, and prediction direction information of the extracted merge candidate.

Figure 7:
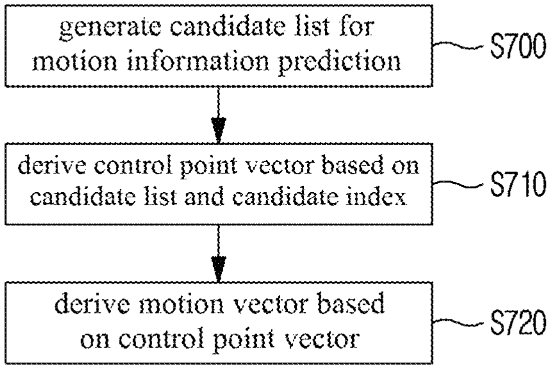
FIG. 7 illustrates a method of deriving motion information based on an affine mode as an embodiment to which the present invention is applied.

FIG. 7 illustrates a method of deriving motion information based on an affine mode as an embodiment to which the present invention is applied.

Referring to FIG. 7, a candidate list for predicting motion information of a current block may be generated (S700).

The candidate list may include one or more affine model-based candidates (hereinafter, referred to as affine candidate). The affine candidate may mean a candidate having a control point vector. The control point vector means a motion vector of the control point for the affine model, and may be defined for a corner position of a block (e.g., at least one of a top-left, a top-right, a bottom-left, or a bottom-right corner).

The affine candidate may include at least one of a spatial candidate, a temporal candidate, or a constructed candidate. Here, the spatial candidate may be derived from a vector of neighboring block spatially adjacent to the current block, and the temporal candidate may be derived from a vector of neighboring block temporally adjacent to the current block. Here, the neighboring block may mean a block encoded with an affine model. The vector may mean a motion vector or a control point vector. Meanwhile, the constructed candidate may be derived based on a combination of motion vectors of spatial/temporal neighboring blocks of the current block.

A method of deriving a spatial/temporal candidate based on a vector of spatial/temporal neighboring blocks will be described in detail with reference to FIG. 8.

A plurality of affine candidates described above may be arranged in the candidate list based on a predetermined priority. For example, the plurality of affine candidates may be arranged in the candidate list in the order of a spatial candidate, a temporal candidate, and a constructed candidate. Alternatively, the plurality of affine candidates may be arranged in the candidate list in the order of a temporal candidate, a spatial candidate, and a constructed candidate. However, the present invention is not limited thereto, and also the temporal candidate may be arranged after the constructed candidate. Alternatively, some of the constructed candidates may be arranged before the spatial candidate, and the rest may be arranged after the spatial candidate.

A control point vector of the current block may be derived based on the candidate list and the candidate index (S710).

The candidate index may mean an index that is coded to derive the control point vector of the current block. The candidate index may specify any one of a plurality of affine candidates included in the candidate list. Here, the affine candidate may mean a position of a spatial/temporal candidate or a control point vector of the affine candidate. The control point vector of the current block may be derived using the affine candidate specified by the candidate index.

Specifically, it is assumed that a type of the affine model of the current block is 4-parameter (i.e., when it is determined that the current block uses two control point vectors). In this case, when the affine candidate specified by the candidate index has three control point vectors, only two control point vectors (e.g., control point vector with Idx=0, 1) may be selected from among the three control point vectors, and it may be set as a control point vector of the current block. Alternatively, the three control point vectors of the specified affine candidate may be set as the control point vectors of the current block. In this case, the type of the affine model of the current block may be updated to 6-parameter.

On the other hand, it is assumed that the type of the affine model of the current block is 6-parameter (i.e., when it is determined that the current block uses three control point vectors). In this case, when the affine candidate specified by the candidate index has two control point vectors, one additional control point vector may be generated, and the two control point vectors of the affine candidate and the additional control point vector may be set as the control point vectors of the current block. The additional control point vector may be derived based on at least one of two control point vectors of the affine candidate, size of a current/neighboring block, or position information of a current/neighboring block.

Alternatively, the two control point vectors of the specified affine candidate may be set as the control point vectors of the current block. In this case, the type of the affine model of the current block may be updated to 4-parameter.

Alternatively, the control point vector of the specified affine candidate may be set as a control point vector predictor (cpmvp) of the current block. In this case, a control point vector difference (cpmvd) may be signaled for the current block. The number of signaled control point vector differences may be determined according to a type of the affine model of the current block. That is, when the type of the affine model of the current block is 4-parameter, the mvd_coding( ) function may be invoked twice to obtain the differences of the two control point vectors. Similarly, when the affine model type of the current block is 6-parameter, the mvd_coding( ) function may be invoked three times to obtain the differences of the three control point vectors. The control point vector (cpmv) may be reconstructed using the control point vector predictor (cpmvp) and the control point vector difference (cpmvd) of the current block.

A motion vector of the current block may be derived based on the control point vector of the current block (S720).

The motion vector may be derived in units of a current block or sub-blocks. For this, the current block may be partitioned into a plurality of N×M sub-blocks. Here, the N×M sub-block may be in the form of a rectangle (N>M or N<M) or a square (N=M). Values of the N and the M may be 4, 8, 16, 32 or more.

For example, the size/shape of the sub-block may be a fixed size/shape pre-defined in the decoding apparatus. For example, the size/shape of the sub-block may be a square such as 4×4, 8×8, 16×16, or the like, or a non-square such as 2×4, 2×8, 4×8, 4×16, etc. Alternatively, the sub-block may be defined as a block in which the sum of the width and height is 8, 12, 16 or more. Alternatively, the sub-block may be defined as a block in which a product of the width and the height is an integer of 16, 32, 64 or more.

Alternatively, the size/shape of the sub-block may be variably derived based on the attribute of the above-described block. For example, when the size of the current block is greater than or equal to a predetermined threshold size, the current block may be divided into units of a first sub-block (e.g., 8×8, 16×16), otherwise, the current block may be divided into units of a second sub-block (e.g., 4×4).

Alternatively, information on the size/shape of the sub-block may be encoded and signaled by an encoding apparatus. The information indicates at least one of the size or shape of the sub-block, which may be signaled in at least one level among a sequence, a picture, a tile group, a tile, and a CTU.

The control point representing the current block may include a top-left position and a top-right position. However, the present invention is not limited thereto, and the control point may include three points of a top-left position, a top-right position and a bottom-left position, or may further include a plurality of additional points.

When two control points are used, a motion vector for each sub-block of the current block may be derived by using at least one of a first control point vector corresponding to a first control point, a second control point vector corresponding to a second control point, a position of the sub-block (x,y), or a size (width or height) of the current block.

When three control points are used, a motion vector for each sub-block of the current block may be derived by using at least one of a first control point vector corresponding to a first control point, a second control point vector corresponding to a second control point, a third control point vector corresponding to a third control point, the position of the sub-block (x,y), or the size (width or height) of the current block. In this case, a difference vector between the second control point vector and the first control point vector may be used, and a difference vector between the third control point vector and the first control point vector may be used. The difference vector may be calculated for each of a horizontal direction (x-axis direction) and a vertical direction (y-axis direction).

The motion vector derivation process may further include a process of applying a predetermined offset to the motion vector derived based on the control point vector. The offset may mean a vector for improving a pre-derived motion vector. The offset may be determined based on information on at least one of an absolute or a direction of the offset. The absolute may be an integer of 1, 2, 3, or more. The direction may include at least one of left, right, top, and bottom. Information on the absolute and/or direction of the offset may be encoded and signaled by an encoding apparatus. Alternatively, the absolute of the offset may be a predetermined fixed value in a decoding apparatus.

Figure 8:
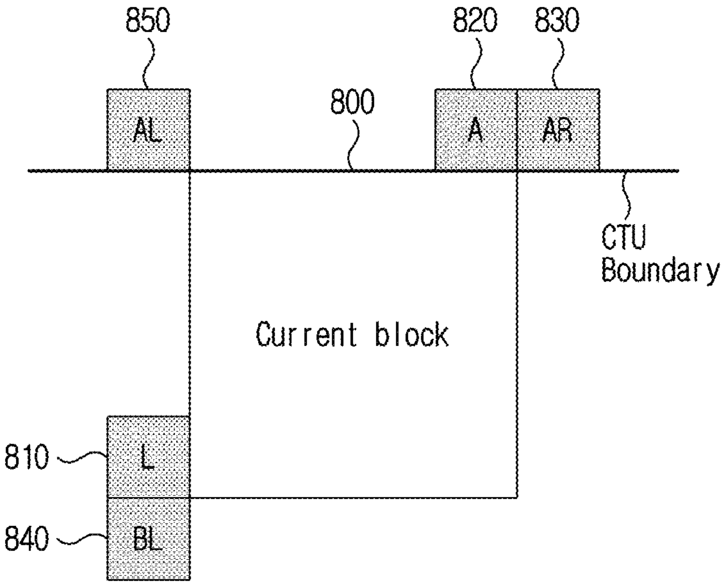
FIG. 8 relates to a method of deriving an affine candidate from a control point vector of a spatial/temporal neighboring block as an embodiment to which the present invention is applied.

FIG. 8 relates to a method of deriving an affine candidate from a control point vector of a spatial/temporal neighboring block as an embodiment to which the present invention is applied.

A width and a height of the current block 800 are chW and cbH, respectively, and a position of the current block is (xCb, yCb). The width and height of spatial neighboring blocks 810-850 are nbW and nbH, respectively, and the positions of the spatial neighboring blocks are (xNb, yNb). The spatial neighboring block may include at least one of a left block 810, a below-left block 840, an above-right block 830, an above block 820, or an above-left block 850 of the current block. Alternatively, the spatial neighboring block may further include at least one of a block adjacent to the right side or a block adjacent to the below side of the above left block 850.

The spatial candidate may have n control point vectors (cpMV). Here, the n value may be an integer of 1, 2, 3, or more. The n value may be determined based on at least one of information on whether to be decoded in units of sub-blocks, information on whether the block is encoded with an affine model, or information on a type of the affine model (4-parameter or 6-parameter).

For example, according to the information, when the block is decoded in units of sub-blocks or is a block encoded by the affine model, the block may have two control point vectors. On the other hand, otherwise, the block may not perform the affine model-based prediction.

Alternatively, according to the information, when the block is a block encoded with the affine model and the type of the affine model is 6-parameter, the block may have three control point vectors. On the other hand, otherwise, the block may not perform the affine model-based prediction.

The above-described information may be encoded and signaled by an encoding device. Alternatively, all or part of the information may be derived from the decoding device based on the attribute of a block. Here, the block may mean a current block or a spatial/temporal neighboring block of the current block. The attribute may mean a size, a shape, a position, a partition type, an inter mode, a parameter related to a residual coefficient, etc. The inter mode may be a mode pre-defined in the decoding apparatus and may mean a merge mode, a skip mode, an AMVP mode, an affine model, an intra/inter combination mode, a current picture reference mode, etc. Alternatively, the value of n may be derived from the decoding device based on the above-described block attribute.

In this embodiment, the n control point vectors may be expressed as a first control point vector (cpMV[0]), a second control point vector (cpMV[1]), a third control point vector (cpMV[2]), . . . n-th control point vector (cpMV[n−1]).

For example, the first control point vector (cpMV[0]), the second control point vector (cpMV[1]), the third control point vector (cpMV[2]), and the fourth control point vector (cpMV[3]) may be respectively a vector corresponding to the position of the top-left sample, the top-right sample, the bottom-left sample, and the bottom-right sample. Here, it is assumed that the spatial candidate may have three control point vectors, and the three control point vectors may be arbitrary control point vectors selected from the first to n-th control point vector. However, the present invention is not limited thereto, and the spatial candidate may have two control point vectors, and the two control point vectors may be arbitrary control point vectors selected from the first to n-th control point vector.

Hereinafter, a method of deriving a control point vector of a spatial candidate will be described.

1. When a Boundary of the Current Block does not Coincide with a CTU Boundary

The first control point vector may be derived based on at least one of a first control point vector of a spatial neighboring block, a predetermined difference value, position information of a current block (xCb, yCb), or position information on the spatial neighboring block (xNb, yNb).

The number of the difference value may be 1, 2, 3 or more. The number of difference value may be variably determined in consideration of the above-described attribute of the block, or may be a fixed value pre-committed to the decoding apparatus. The difference value may be defined as a difference value between one of a plurality of control point vectors and the other. For example, the difference value may include at least one of a first difference value between the second control point vector and the first control point vector, a second difference value between the third control point vector and the first control point vector, a third difference value between and the fourth control point vector and the third control point vector, or a fourth difference value between the fourth control point vector and the second control point vector.

For example, the first control point vector may be derived as in Equation 1 below.

$$cpMvLX[0][0] = (mvScaleHor + dHorX*(xCb - xNb) + dHorY*(yCb - yNb))$$
$$cpMvLX[0][1] = (mvScaleVer + dVerX*(xCb - xNb) + dVerY*(yCb - yNb)) \quad \text{[Equation 1]}$$

In Equation 1, the variables mvScaleHor and mvScaleVer may mean a first control point vector of a spatial neighboring block, or a value derived by applying a shift operation by k to the first control point vector. Here, the k may be an integer of 1, 2, 3, 4, 5, 6, 7, 8, 9 or more. The variables dHorX and dVerX correspond to the x and y components of the first difference value between the second control point vector and the first control point vector, respectively. The variables dHorY and dVerY correspond to the x and y components of the second difference value between the third control point vector and the first control point vector, respectively. The above-described variable can be derived as in Equation 2 below.

$$mvScaleHor = CpMvLX[xNb][yNb][0][0] \ll 7 \quad \text{[Equation 2]}$$
$$mvScaleVer = CpMvLX[xNb][yNb][0][1] \ll 7$$
$$dHorX = (CpMvLX[xNb + nNbW - 1][yNb][1][0] - CpMvLX[xNb][yNb][0][0]) \ll (7 - \log2NbW)$$
$$dVerX = (CpMvLX[xNb + nNbW - 1][yNb][1][1] - CpMvLX[xNb][yNb][0][1]) \ll (7 - \log2NbW)$$
$$dHorY = (CpMvLX[xNb][yNb + nNbH - 1][2][0] - CpMvLX[xNb][yNb][2][0]) \ll (7 - \log2NbH)$$
$$dVerY = (CpMvLX[xNb][yNb + nNbH - 1][2][1] - CpMvLX[xNb][yNb][2][1]) \ll (7 - \log2NbH)$$

The second control point vector may be derived based on at least one of the first control point vector of the spatial neighboring block, a predetermined difference value, position information of the current block (xCb, yCb), a block size (width or height), or position information of the spatial neighboring block (xNb, yNb). Here, the block size may mean the size of a current block and/or a spatial neighboring block. The difference value is as described in the first control point vector, and a detailed description thereof will be omitted. However, the range and/or number of difference values used in the process of deriving the second control point vector may be different from the first control point vector.

For example, the second control point vector may be derived as in Equation 3 below.

$$cpMvLX[1][0] = (mvScaleHor + dHorX*(xCb + cbWidth - xNb) + dHorY*(yCb - yNb)) \quad \text{[Equation 3]}$$
$$cpMvLX[1][1] = (mvScaleVer + dVerX*(xCb + cbWidth - xNb) + dVerY*(yCb - yNb))$$

In Equation 3, the variables mvScaleHor, mvScale Ver, dHorX, dVerX, dHorY, and dVerY are as described in Equation 1, and detailed descriptions thereof will be omitted.

The third control point vector may be derived based on at least one of the first control point vector of the spatial neighboring block, a predetermined difference value, position information of the current block (xCb, yCb), a block size (width or height), or position information of a spatial neighboring block (xNb, yNb). Here, the block size may mean the size of a current block and/or a spatial neighboring block. The difference value is as described in the first control point vector, and a detailed description thereof will be omitted. However, the range and/or number of difference values used in the process of deriving the third control point vector may be different from the first control point vector or the second control point vector.

For example, the third control point vector may be derived as in Equation 4 below.

$$cpMvLX[2][0] = (mvScaleHor + dHorX * (xCb - xNb) + dHorY * (yCb + cbHeight - yNb))$$
$$cpMvLX[2][1] = (mvScaleVer + dVerX * (xCb - xNb) + dVerY * (yCb + cbHeight - yNb)) \quad \text{[Equation 4]}$$

In Equation 4, the variables mvScaleHor, mvScaleVer, dHorX, dVerX, dHorY, and dVerY are as described in Equation 1, and detailed descriptions thereof will be omitted. Meanwhile, through the above-described process, an n-th control point vector of a spatial candidate may be derived.

2. When the Boundary of the Current Block Coincides with the CTU Boundary

The first control point vector may be derived based on at least one of a motion vector (MV) of a spatial neighboring block, a predetermined difference value, position information of a current block (xCb, yCb), or position information of a spatial neighboring block (xNb, yNb).

The motion vector may be a motion vector of a sub-block located at the bottom of the spatial neighboring block. The sub-block may be located at the leftmost, center, or rightmost among a plurality of sub-blocks located at the bottom of the spatial neighboring block. Alternatively, the motion vector may mean an average value, a maximum value, or a minimum value of motion vectors of a sub-block.

The number of difference values may be 1, 2, 3 or more. The number of difference values may be variably determined in consideration of the above-described attribute of the block, or may be a fixed value pre-committed to the decoding apparatus. The difference value may be defined as a difference value between one of a plurality of motion vectors stored in units of sub-blocks in the spatial neighboring block and the other. For example, the difference value may mean a difference value between a motion vector of a bottom-right sub-block and a motion vector of a bottom-left sub-block of the spatial neighboring block.

For example, the first control point vector may be derived as in Equation 5 below.

$$cpMvLX[0][0] = (mvScaleHor + dHorX * (xCb - xNb) + dHorY * (yCb - yNb))$$
$$cpMvLX[0][1] = (mvScaleVer + dVerX * (xCb - xNb) + dVerY * (yCb - yNb)) \quad \text{[Equation 5]}$$

In Equation 5, the variables mvScaleHor and mvScale Ver may mean a motion vector (MV) of the above-described spatial neighboring block or a value derived by applying a shift operation by k to the motion vector. Here, the k may be an integer of 1, 2, 3, 4, 5, 6, 7, 8, 9 or more.

The variables dHorX and dVerX correspond to the x and y components of a predetermined difference value, respectively. Here, the difference value means a difference value between the motion vector of the bottom-right sub-block and the motion vector of the bottom-left sub-block in the spatial neighboring block. The variables dHorY and dVerY can be derived based on the variables dHorX and dVerX. The above-described variable may be derived as in Equation 6 below.

$$mvScaleHor = MvLX[xNb][[yNb + nNbH - 1][0] \ll 7 \quad \text{[Equation 6]}$$
$$mvScaleVer = MvLX[xNb][[yNb + nNbH - 1][1] \ll 7$$
$$dHorX = (MvLX[xNb + nNbW - 1][yNb + nNbH - 1][0] - MvLX[xNb][yNb + nNbH - 1][0]) \ll (7 - \log 2NbW)$$
$$dVerX = (MvLX[xNb + nNbW - 1][yNb + nNbH - 1][1] - MvLX[xNb][yNb + nNbH - 1][1]) \ll (7 - \log 2NbW)$$
$$dHorY = -dVerX$$
$$dVerY = dHorX$$

The second control point vector may be derived based on at least one of a motion vector (MV) of the spatial neighboring block, a predetermined difference value, position information of a current block (xCb, yCb), a block size (width or height), or position information of a spatial neighboring block (xNb, yNb). Here, the block size may mean a size of the current block and/or the spatial neighboring block. The motion vector and the difference value are as described in the first control point vector, and a detailed description thereof will be omitted. However, the position of the motion vector used in the derivation process of the second control point vector, the range and/or number of the difference values may be different from the first control point vector.

For example, the second control point vector may be derived as in Equation 7 below.

$$cpMvLX[1][0] = (mvScaleHor + dHorX * (xCb + cbWidth - xNb) + dHorY * (yCb - yNb))$$
$$cpMvLX[1][1] = (mvScaleVer + dVerX * (xCb + cbWidth - xNb) + dVerY * (yCb - yNb)) \quad \text{[Equation 7]}$$

In Equation 7, the variables mvScaleHor, mvScale Ver, dHorX, dVerX, dHorY, and dVerY are as described in Equation 5, and detailed descriptions thereof will be omitted.

The third control point vector may be derived based on at least one of a motion vector (MV) of the spatial neighboring block, a predetermined difference value, position information of a current block (xCb, yCb), a block size (width or height), or position information of a spatial neighboring block (xNb, yNb). Here, the block size may mean the size of the current block and/or the spatial neighboring block. The motion vector and the difference value are as described in the first control point vector, and a detailed description thereof will be omitted. However, the position of the motion vector used in the derivation process of the third control point vector, the range and/or the number of the difference values may be different from the first control point vector or the second control point vector.

For example, the third control point vector may be derived as in Equation 8 below.

$$cpMvLX[2][0] = (mvScaleHor + dHorX * (xCb - xNb) + dHorY * (yCb + cbHeight - yNb)) \quad \text{[Equation 8]}$$

-continued $cpMvLX[2][1] =$ $$(mvScaleVer + dVerX * (xCb - xNb) + dVerY * (yCb + cbHeight - yNb))$$

In Equation 8, the variables mvScaleHor, mvScale Ver, dHorX, dVerX, dHorY, and dVerY are as described in Equation 5, and detailed descriptions thereof will be omitted. Meanwhile, through the above-described process, an n-th control point vector of the spatial candidate may be derived.

The above-described process of deriving the affine candidate may be performed for each pre-defined spatial neighboring block. The pre-defined spatial neighboring block may include at least one of a left block, a below-left block, an above-right block, an above block, or an above-left block of the current block.

Alternatively, the process of deriving the affine candidate may be performed for each group of the spatial neighboring blocks. Here, the spatial neighboring blocks may be classified into a first group including a left block and a below-left block, and a second group including an above-right block, an above block, and an above-left block.

For example, one affine candidate may be derived from spatial neighboring block belonging to the first group. The derivation may be performed until an available affine candidate is found based on a predetermined priority. The priority may be in the order of left block→below-left block, or the reverse order. According to the priority, it is determined whether the spatial neighboring block in the first group is a block decoded through affine model-based prediction, and the first decoded block by the affine model-based prediction may be selected as the affine candidate.

Similarly, one affine candidate may be derived from spatial neighboring block belonging to the second group. The derivation may be performed until an available affine candidate is found based on a predetermined priority. The priority may be in the order of above-right block→above block→above-left block, or the reverse order. According to the priority, it is determined whether the spatial neighboring block in the second group is a block decoded through affine model-based prediction, and the first decoded block by the affine model-based prediction may be selected as the affine candidate.

The above-described embodiment can be applied in the same/similar manner to a temporal neighboring block. Here, the temporal neighboring block may be a block that belongs to a picture different from the current block, but at the same position as the current block. The co-located block may be a block including a position of a top-left sample of the current block, a center position, or a position of a sample adjacent to the bottom-right sample of the current block.

Alternatively, the temporal neighboring block may mean a block at a position shifted by a predetermined disparity vector from the block at the same position. Here, the disparity vector may be determined based on a motion vector of any one of the above-described spatial neighboring blocks of the current block.

Figure 9:
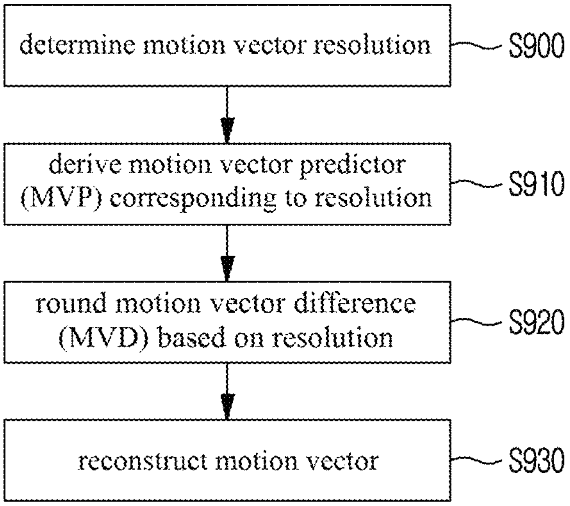
FIG. 9 illustrates a method of adaptively adjusting a resolution of a motion vector as an embodiment to which the present invention is applied.

FIG. 9 illustrates a method of adaptively adjusting a resolution of a motion vector as an embodiment to which the present invention is applied.

Referring to FIG. 9, a resolution of a motion vector of a current block may be determined (S900).

Here, the motion vector may mean a pre-reconstructed motion vector (mv), but may be replaced with a motion vector predictor (mvp) or a motion vector difference (mvd).

The encoding/decoding apparatus may select any one of a plurality of pre-defined resolution candidates and determine this as a resolution of the motion vector. The plurality of resolution candidates may include at least one of 1/16 pixel, 1/8 pixel, 1/4 pixel, 1/2 pixel, 1 pixel, 2 pixel, or 4 pixel.

The selection may be performed in a higher level unit such as a video parameter set (VPS), a sequence parameter set (SPS), a picture parameter set (PPS), a slice header, etc. That is, motion compensation may be performed on all blocks referring to the corresponding higher level unit based on a motion vector having the same resolution. Meanwhile, the selection may be performed in a lower level unit, such as a coding block, a prediction block, a transform block, a sub-block, etc. That is, motion compensation may be performed based on motion vectors having different resolutions for each corresponding lower level.

The selection may be performed based on an index specifying any one of a plurality of resolution candidates (Embodiment 1). In this case, resolution candidates corresponding to each index may be defined as shown in Table 1, and the index may be an integer within the range of 0 to (number of resolution candidates−1).

TABLE 1

| index(idx) | resolution candidate |
|---|---|
| 0 | 1/16 pixel |
| 1 | 1/4 pixel |
| 2 | 1/2 pixel |
| 3 | 1 pixel |
| 4 | 4 pixel |

Table 1 is only an example of an index allocated for each resolution candidate, and does not limit the priority order and number of resolution candidates. For example, 1/4 pixel may have a higher priority than 1/16 pixel, and an index smaller than 1/16 pixel may be allocated to 1/4 pixel. Alternatively, 1/4 pixel or 1/2 pixel may have an index smaller than 1/16 pixel.

The number of resolution candidates that is available for a current block may be at most N, and N may be a natural number of 1, 2, 3, 4, 5 or more. The number may be a fixed value pre-committed to the encoding/decoding apparatus. Alternatively, it may be variably determined in consideration of the coding parameter of the current block. The coding parameter may be variably determined in consideration of at least one of a size/shape/position of a block, whether to perform bi-directional prediction, inter mode, or component type. For example, if the size of the current block is smaller than the threshold size, p resolution candidates may be used, otherwise, q resolution candidates may be used. Here, p may be a natural number less than q. Alternatively, when the inter mode of the current block is an affine mode, the number of resolution candidates may be two or three. Alternatively, when the inter mode of the current block is the AMVP mode, the number of resolution candidates may be 3, 4, or 5. And, when the inter mode of the current block is the IBC mode, the number of resolution candidates may be 1, 2, or 3. Alternatively, the same number of resolution candidates may be set to be used regardless of the aforementioned block size or the aforementioned inter mode.

Alternatively, two indexes may be used to specify any one of a plurality of resolution candidates (Embodiment 2). The two indexes are referred to as a first index and a second index. The first index is information encoded to specify the resolution of the motion vector. For example, if the first index is the first value, the resolution of the motion vector may be determined as 1/4 pixel, and otherwise, the resolution of the motion vector may be determined based on the second index. For example, the resolution of the motion vector for each of the first and second indexes may be defined in consideration of the inter mode as shown in Table 2 below.

TABLE 2

| | | resolution candidate | | |
|---|---|---|---|---|
| first index | second index | affine mode (shift value) | IBC mode (shift value) | AMVP mode (shift value) |
| 0 | — | 1/4 pixel (2) | — | 1/4 Pixel (2) |
| 1 | 0 | 1/16 pixel (0) | 1 pixel (4) | 1/2 Pixel (3) |
| 1 | 1 | 1 pixel (4) | 4 pixel (6) | 1 Pixel (4) |
| 1 | 2 | — | — | 4 pixel (6) |

Table 2 is only an example of resolution candidates for each second index, and does not limit the corresponding resolution candidates for each second index. For example, in the affine mode, 1/2 pixel, 1/8 pixel, etc. may correspond to the second index 0, and 2 pixels, 4 pixels, etc. may correspond to the second index 1. Likewise, in the case of the IBC mode, 2 pixels may correspond to the second index 0 or 1. However, unlike Table 2, the same resolution candidate may be configured regardless of the inter mode, or the same resolution candidate may be configured for the IBC mode and the AMVP mode. The same resolution candidate may be configured with at least two of 1/4 pixel, 1/2 pixel, 1 pixel, or 4 pixels.

The first index may be signaled when the inter mode of the current block is the AMVP mode or the affine mode (condition 1). In addition, the first index may be signaled only when a non-zero motion vector difference or a control point vector difference is signaled for the current block (condition 2). The first index may be signaled based on a flag indicating whether an adaptive motion vector resolution is used in motion vector encoding/decoding. That is, the first index may be signaled only when the flag is a first value (condition 3). The flag may be signaled at a higher level of at least one of a video parameter set (VPS), a sequence parameter set (SPS), or a picture parameter set (PPS). When all of the conditions 1 to 3 are satisfied, the first index may be signaled, or when at least one of the conditions 1 to 3 is satisfied, the first index may be signaled. The second index may be signaled only when the resolution of the motion vector is not 1/4 pixel according to the first index.

Referring to FIG. 9, a motion vector predictor corresponding to the determined resolution may be derived (S910).

For example, when the resolution of the motion vector is determined as 1/4 pixel and the resolution of the pre-derived motion vector prediction value is 1/16 pixel, the resolution may be adjusted to 1/4 pixel by shifting the motion vector predictor by 2. Alternatively, when the resolution of the motion vector is determined as 1 pixel and the resolution of the pre-derived motion vector prediction value is 1/16 pixels, the resolution may be adjusted to 1 pixel by shifting the motion vector predictor by 4. That is, by applying a predetermined shift value to the pre-derived vector component, the resolution or precision of the vector component may be adjusted, which will be referred to as rounding.

It is assumed that the resolution of the motion vector predictor before rounding is 1/16 pixels. In this case, the shift value for rounding may be defined as shown in Table 2.

In the AMVP mode, the rounding may be performed after any one of a plurality of motion vectors included in a candidate list is specified. That is, rounding may be performed only for one candidate specified by an index, without performing rounding according to the determined resolution for each of the plurality of candidates constituting the candidate list.

Alternatively, in the AMVP mode, the rounding may be performed on each motion vector of a spatial/temporal neighboring block, and a candidate list may be constructed based on the rounded motion vector. In this case, one motion vector specified from the candidate list is set as a motion vector predictor of the current block, and an additional rounding process is not performed.

Likewise, in the affine mode, the rounding may be performed after any one of a plurality of candidates included in the candidate list is specified. That is, rounding may be performed only for one candidate specified by an index, without performing rounding according to the determined resolution for each of the plurality of candidates constituting the candidate list. Some of the plurality of candidates may be constructed as control point vectors, and the others may be constructed as motion vectors.

Alternatively, in the affine mode, the rounding may be performed on each vector of spatial/temporal neighboring blocks, and a candidate list may be constructed based on the rounded vector. In this case, one vector specified from the candidate list is set as the control point vector predictor (cpmvp) of the current block, and additional rounding may not be performed on the control point vector predictor.

Referring to FIG. 9, based on the determined resolution, a motion vector difference may be rounded (S920).

The motion vector difference value may be reconstructed based on predetermined coding information. The coding information may be signaled to decode a motion vector difference. When the current block is encoded in the AMVP mode, one motion vector difference may be signaled by invoking the mvd_coding( ) function once. Alternatively, when the current block is encoded in the affine mode, the motion vector difference of S920 may be understood as a control point vector difference. In this case, when the type of the affine model of the current block is 4-parameter, the mvd_coding( ) function may be invoked twice to obtain the two control point vector differences. Similarly, when the affine model type of the current block is 6-parameter, the mvd_coding( ) function may be invoked three times to obtain the three control point vectors differences.

Based on the resolution determined in S900, the motion vector difference may be rounded. That is, the motion vector difference may be shifted by the shift value defined in Table 2 to adjust the resolution of the motion vector difference. Alternatively, the resolution of the control point vector difference may be adjusted by shifting each of the above-described plurality of control point vector differences by a shift value defined in Table 2.

Referring to FIG. 9, the motion vector of the current block may be reconstructed based on the rounded motion vector predictor and the motion vector difference (S930).

Of course, when the current block is encoded in the affine mode, the control point vector of the current block may be reconstructed based on the rounded control point vector predictor and the control point vector difference.

Alternatively, rounding may be performed only on the finally reconstructed motion vector based on the resolution determined in S900. In this case, at least one of the rounding for the motion vector predictor of S910 and the rounding for the motion vector difference of S920 may be omitted.

Alternatively, the adaptive motion vector resolution may be limited to being applied only to the inter mode (e.g., AMVP mode) in which the motion vector difference value is signaled, and the inter mode in which the motion vector difference value is not signaled (e.g., merge Mode) may be set to be applied.

Figure 10:
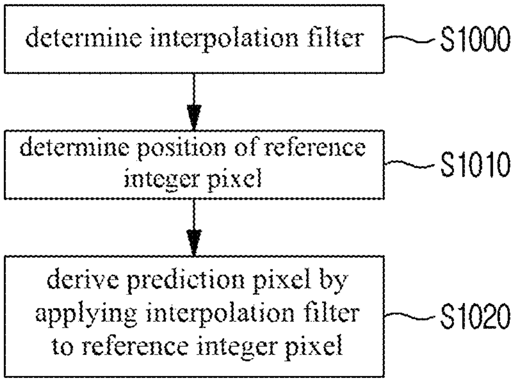
FIG. 10 illustrates an inter prediction method based on interpolation as an embodiment to which the present invention is applied.

FIG. 10 illustrates an inter prediction method based on interpolation as an embodiment to which the present invention is applied.

Referring to FIG. 10, an interpolation filter of a current block may be determined (S1000).

The encoding/decoding apparatus may define one or more interpolation filter sets. When a plurality of interpolation filter sets are defined, any one of the plurality of interpolation filter sets may be selectively used in consideration of block attribute. Here, the block attribute may include a size, shape, and inter mode of the current block or sub-block.

For example, if the inter mode of the current block is the affine mode, and the current block or sub-block is 4×4, a first interpolation filter set as shown in Table 3 below may be selected, otherwise, a second interpolation filter set as shown in Table 4 below may be selected.

TABLE 3

| Fractional sample | interpolation filter coefficients | | | | | | | |
|---|---|---|---|---|---|---|---|---|
| position p | $f_L$[p][0] | $f_L$[p][1] | $f_L$[p][2] | $f_L$[p][3] | $f_L$[p][4] | $f_L$[p][5] | $f_L$[p][6] | $f_L$[p][7] |
| 1 | 0 | 1 | −3 | 63 | 4 | −2 | 1 | 0 |
| 2 | 0 | 1 | −5 | 62 | 8 | −3 | 1 | 0 |
| 3 | 0 | 2 | −8 | 60 | 13 | −4 | 1 | 0 |
| 4 | 0 | 3 | −10 | 58 | 17 | −5 | 1 | 0 |
| 5 | 0 | 3 | −11 | 52 | 26 | −8 | 2 | 0 |
| 6 | 0 | 2 | −9 | 47 | 31 | −10 | 3 | 0 |
| 7 | 0 | 3 | −11 | 45 | 34 | −10 | 3 | 0 |
| 8 | 0 | 3 | −11 | 40 | 40 | −11 | 3 | 0 |
| 9 | 0 | 3 | −10 | 34 | 45 | −11 | 3 | 0 |
| 10 | 0 | 3 | −10 | 31 | 47 | −9 | 2 | 0 |
| 11 | 0 | 2 | −8 | 26 | 52 | −11 | 3 | 0 |
| 12 | 0 | 1 | −5 | 17 | 58 | −10 | 3 | 0 |
| 13 | 0 | 1 | −4 | 13 | 60 | −8 | 2 | 0 |
| 14 | 0 | 1 | −3 | 8 | 62 | −5 | 1 | 0 |
| 15 | 0 | 1 | −2 | 4 | 63 | −3 | 1 | 0 |

TABLE 4

| Fractional sample | interpolation filter coefficients | | | | | | | |
|---|---|---|---|---|---|---|---|---|
| position p | $f_L$[p][0] | $f_L$[p][1] | $f_L$[p][2] | $f_L$[p][3] | $f_L$[p][4] | $f_L$[p][5] | $f_L$[p][6] | $f_L$[p][7] |
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −9 | 47 | 31 | −10 | 4 | −1 |
| 7 | −1 | 4 | −11 | 45 | 34 | −10 | 4 | −1 |
| 8 (hpelIfIdx == 0) | −1 | 4 | −11 | 40 | 40 | −11 | 4 | −1 |
| 8 (hpelIfIdx == 1) | 0 | 3 | 9 | 20 | 20 | 9 | 3 | 0 |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 |

The first and second interpolation filter sets define interpolation filters for each fractional pixel position. In this case, the fractional pixel position is based on the resolution or precision of 1/16 pixels.

The fractional pixel position to be interpolated may be specified by the motion vector of the current block. Here, the motion vector may be reconstructed through the above-described rounding process. However, as shown in Table 4, the second interpolation filter set may define two interpolation filters for a resolution of ½ pixel. When the specified fractional pixel position to be interpolated is 8, one of the two interpolation filters may be selected according to the variable hpelIfIdx. The variable hpelIfIdx may be derived based on the above-described shift value. For example, if the shift value is 3 (that is, when the resolution of the motion vector is determined to be ½ pixel), the variable hpelIfIdx may be derived as 1, otherwise, the variable hpelIfIdx may be derived as 0.

Referring to FIG. 10, a reference integer pixel position may be determined (S1010).

The reference integer pixel may belong to a reference picture of the current block. The reference picture may be a picture in a time zone different from the current block or a current picture to which the current block belongs.

The reference integer pixel position is (xInti, yInti), and xInti and yInti may be determined as in Equation 9 below.

$$xInti = (xIntL + i - 3),\ i = 0 \ldots 7 \quad \text{[Equation 9]}$$

$$yInti = (xIntL + i - 3),\ i = 0 \ldots 7$$

In Equation 9, (xIntL, yIntL) may represent the reference integer pixel position for specifying a position of a fractional pixel to be interpolated (hereinafter referred to as an interpolation target pixel).

The reference integer pixel position may be determined according to whether a sub-picture is considered as one picture in an encoding/decoding process. To this end, a flag indicating whether a sub-picture is considered as one picture may be used. When the flag is a first value, the sub-picture may be considered as one picture, otherwise, the sub-picture may not be considered as one picture. The flag may be signaled for each sub-picture constituting one picture.

For example, when the flag is the first value, among xInti calculated in Equation 9, xInti that is out of a left boundary of the current sub-picture may be replaced with a x-coordinate of the left boundary of the sub-picture, and xInti that is out of a right boundary of the current sub-picture may be replaced with a x-coordinate of the right boundary of the sub-picture. In addition, among yInti calculated in Equation 9, yInti that is out of a top boundary of the current sub-picture may be replaced with a y-coordinate of the top boundary of the sub-picture, and yInti that is out of a bottom boundary of the current sub-picture may be replaced with a y-coordinate of the bottom boundary of the sub-picture.

One picture may be divided into one or more sub-pictures. A sub-picture may be composed of one or more slices, or may be composed of one or more tiles. It may be limited so that one slice does not span a plurality of sub-pictures. Alternatively, it may be limited so that one tile does not span a plurality of sub-pictures.

For division into sub-pictures, one picture may be divided in vertical and horizontal directions at k-grid intervals. Each grid may be assigned an index. Grouping may be performed for each grid with the same index. A group of grids with the same index may be defined as a sub-picture.

Referring to FIG. 10, a prediction pixel of a current block may be derived by applying an interpolation filter to the determined reference integer pixel (S1020).

Specifically, when the interpolation target pixel position is a position shifted only in the x-axis direction from the reference integer pixel, the prediction pixel may be derived by applying an interpolation filter to eight reference integer pixels located on the same horizontal line as the interpolation target pixel.

Alternatively, when the interpolation target pixel position is a position shifted only in the y-axis direction from the reference integer pixel, the prediction pixel may be derived by applying an interpolation filter to eight reference integer pixels located on the same vertical line as the interpolation target pixel.

Meanwhile, when the interpolation target pixel position is a position shifted in the x-axis and y-axis directions from the reference integer pixel, an interpolation filter may be applied to eight reference integer pixels located on a horizontal line to calculate reference fractional pixels. The reference fractional pixels may be calculated for each of eight consecutive horizontal pixel lines. A prediction pixel may be derived by applying an interpolation filter to eight reference fractional pixels located on a vertical line.

Alternatively, when the interpolation target pixel position is a position shifted in the x-axis and y-axis directions from the reference integer pixel, an interpolation filter may be applied to eight reference integer pixels located on a vertical line to calculate reference fractional pixels. The reference fractional pixels may be calculated for each of eight consecutive vertical pixel lines. A prediction pixel may be derived by applying an interpolation filter to eight reference fractional pixels located on a horizontal line.

However, the aforementioned 8-tap interpolation filter is only an example, a k-tap interpolation filter may be used, and k may be a natural number of 2, 3, 4, 5, 6, 7 or more. In this case, the above-described interpolation method may be applied the same/similarly. In addition, although the above example describes a case in which a plurality of interpolation filters for the resolution of a specific pixel (½ pixel) are defined, it may also be possible that a plurality of an interpolation filter is applied to one or more of resolutions of the fractional pixel that is obtained based on a predetermined resolution of precision.

Exemplary methods of the present disclosure are expressed as a series of operations for clarity of explanation, but this is not intended to limit the order in which steps are performed, and each step may be performed simultaneously or in a different order if necessary. In order to implement the method according to the present disclosure, the exemplary steps may include additional steps, other steps may be included excluding some steps, or may include additional other steps excluding some steps.

Various embodiments of the present disclosure are not intended to list all possible combinations, but to describe representative aspects of the present disclosure, and matters described in the various embodiments may be applied independently or may be applied in combination of two or more.

In addition, various embodiments of the present disclosure may be implemented by hardware, firmware, software, or a combination thereof. For implementation by hardware, it may be implemented by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), general purpose a processor, a controller, a microcontroller, a microprocessor, etc.

The scope of the present disclosure includes software or machine-executable instructions (e.g., operating systems, applications, firmware, programs, etc.) that cause an operation according to the method of various embodiments to be executed on a device or computer, and or a non-transitory computer-readable medium which stores such software or instructions etc., and is executable on a device or a computer.

INDUSTRIAL AVAILABILITY

The present invention may be used to encode/decode a video signal.

The invention claimed is:

1. A method of decoding an image performed by a decoding apparatus, the method comprising:

determining a flag indicating whether a resolution of a motion vector is adaptive or not;

determining the resolution of the motion vector for a current block based on an indication of the flag;

deriving a motion vector predictor corresponding to the resolution;

adjusting a motion vector difference of the current block based on the resolution;

deriving a motion vector of the current block based on the derived motion vector predictor and the adjusted motion vector difference; and predicting the current block based on the motion vector of the current block, wherein, when the flag indicates that the resolution of the motion vector is adaptive, the resolution is determined as a resolution candidate specified by a predetermined index from among a plurality of resolution candidates, and wherein the plurality of resolution candidates is defined differently based on whether a reference picture of the current block is a current picture or not.

2. The method of claim 1, wherein the predicting the current block comprises:

determining an interpolation filter of the current block;

determining a position of a reference integer pixel; and deriving a prediction pixel of the current block by applying the interpolation filter to the reference integer pixel.

3. The method of claim 2, wherein when a fractional pixel to be interpolated corresponds to a ½ pixel, one of a plurality of interpolation filters pre-defined in a decoding apparatus is selectively used.

4. The method of claim 3, wherein the interpolation filter of the current block is determined as one of the plurality of interpolation filters in consideration of the determined resolution.

5. The method of claim 2, wherein the position of the reference integer pixel is determined in consideration of a position of the sub-picture.

6. A method of encoding an image performed by an encoding apparatus, the method comprising:

deriving a motion vector of a current block;

predicting the current block based on the motion vector of the current block; and determining a resolution of the motion vector for the current block;

deriving a motion vector predictor corresponding to the resolution;

adjusting a motion vector difference of the current block based on the resolution; and encoding the adjusted motion vector difference into a bitstream, wherein a flag indicating whether the resolution of the motion vector is adaptive or not is determined;

wherein, when the flag is determined that the resolution of the motion vector is adaptive, the resolution is determined from among a plurality of resolution candidates and an index indicating the resolution from among the plurality of resolution candidates is encoded into the bitstream, and wherein the plurality of resolution candidates is defined differently based on whether a reference picture of the current block is a current picture or not.

7. An image transmitting method of transmitting a bitstream that is generated by encoding an image based on an image encoding method, comprising:

generating a bitstream by an image encoding method; and transmitting the bitstream, wherein the image encoding method comprises:

deriving a motion vector of a current block;

predicting the current block based on the motion vector of the current block; and determining a resolution of the motion vector for the current block;

deriving a motion vector predictor corresponding to the resolution;

adjusting a motion vector difference of the current block based on the resolution; and encoding the adjusted motion vector difference into a bitstream, wherein a flag indicating whether the resolution of the motion vector is adaptive or not is determined;

wherein, when the flag is determined that the resolution of the motion vector is adaptive, the resolution is determined from among a plurality of resolution candidates and an index indicating the resolution from among the plurality of resolution candidates is encoded into the bitstream, and wherein the plurality of resolution candidates is defined differently based on whether a reference picture of the current block is a current picture or not.

* * * * *